(12) United States Patent
Thompson et al.

(10) Patent No.: US 9,321,544 B2
(45) Date of Patent: Apr. 26, 2016

(54) SYSTEMS AND METHODS FOR OPTIMIZING SATELLITE CONSTELLATION DEPLOYMENT

(71) Applicant: THE AEROSPACE CORPORATION, El Segundo, CA (US)

(72) Inventors: Timothy Guy Thompson, Purcellville, VA (US); Matthew Phillip Ferringer, Round Hill, VA (US); Marc David DiPrinzio, South Riding, VA (US); Ronald Scott Clifton, Leesburg, VA (US)

(73) Assignee: The Aerospace Corporation, El Segundo, CA (US)

( * ) Notice: Subject to any disclaimer, the term of this patent is extended or adjusted under 35 U.S.C. 154(b) by 160 days.

(21) Appl. No.: 14/328,026

(22) Filed: Jul. 10, 2014

(65) Prior Publication Data

US 2016/0009425 A1  Jan. 14, 2016

(51) Int. Cl.
*B64G 1/10* (2006.01)
*B64G 1/00* (2006.01)
*G01S 19/06* (2010.01)

(52) U.S. Cl.
CPC .............. *B64G 1/1085* (2013.01); *B64G 1/002* (2013.01)

(58) Field of Classification Search
CPC ........ B64G 1/085; B64G 1/002; G01S 19/06; G01S 19/13
USPC ............................ 701/13; 342/357.51, 357.66
See application file for complete search history.

(56) References Cited

U.S. PATENT DOCUMENTS

| | | | |
|---|---|---|---|
| 5,568,590 A | 10/1996 | Tolson | |
| 6,532,076 B1 | 3/2003 | Sidorowich | |
| 7,646,338 B2 * | 1/2010 | Monnerat | G01S 19/06 342/357.66 |
| 7,660,773 B1 | 2/2010 | Kumar | |
| 7,987,143 B2 | 7/2011 | Goel | |
| 7,996,344 B1 | 8/2011 | Goel | |
| 8,069,127 B2 | 11/2011 | Taylor et al. | |
| 8,255,344 B2 | 8/2012 | Ferringer et al. | |
| 8,255,345 B2 | 8/2012 | Ferringer et al. | |
| 8,285,653 B2 | 10/2012 | Ferringer et al. | |
| 8,433,662 B2 | 4/2013 | Ferringer et al. | |
| 8,494,988 B2 | 7/2013 | Ferringer et al. | |
| 8,498,952 B2 | 7/2013 | Ferringer et al. | |
| 8,504,496 B2 | 8/2013 | Ferringer et al. | |
| 8,560,472 B2 | 10/2013 | Ferringer et al. | |
| 2008/0010044 A1 | 1/2008 | Ruetsch | |
| 2010/0292929 A1 | 11/2010 | Ferringer et al. | |

(Continued)

OTHER PUBLICATIONS

Muhlenbein, Heinz et al.; "Evolution in time and space—the parallel genetic algorithm."; 1991; Morgan Kaufmann; pp. 1-22.

(Continued)

*Primary Examiner* — Tan Q Nguyen
(74) *Attorney, Agent, or Firm* — Sutherland Asbill & Brennan LLP

(57) ABSTRACT

Systems and methods are provided to determine launch parameters of satellites of a satellite constellation that provides optimized performance of the satellite constellation over the service lifetime of the satellite constellation. The launch parameters may be determined by considering perturbing accelerations of one or more of the satellites for the purposes of optimizing the launch parameters of the satellites of the satellite constellation. The systems and methods may include heuristic optimization and high-fidelity astrodynamic modeling methodologies.

20 Claims, 12 Drawing Sheets

(56) References Cited

U.S. PATENT DOCUMENTS

| | | |
|---|---|---|
| 2010/0293120 A1 | 11/2010 | Ferringer et al. |
| 2010/0293122 A1 | 11/2010 | Ferringer et al. |
| 2010/0293313 A1 | 11/2010 | Ferringer et al. |
| 2011/0078100 A1 | 3/2011 | Goel |
| 2012/0084314 A1 | 4/2012 | Ferringer et al. |
| 2012/0197830 A1 | 8/2012 | Hadka et al. |
| 2013/0031140 A1 | 1/2013 | Ferringer et al. |

OTHER PUBLICATIONS

Cantu-Paz, Erick et al.; "Efficient parallel genetic algorithms: theory and practice." 2000; Comput. Methods Appl. Mech. Engrg. 186 (2000) pp. 221-238; Elsevier Science S.A.

Search Report and Written Opinion for International Application No. PCT/US2010/034955 mailed Aug. 17, 2010.

Ferringer, Matthew P. et al.; "Many-objective Reconfiguration of Operational Satellite Constellations with the Large-Cluster Epsilon Non-dominated Sorting Genetic Algorithm-11." 2009 IEEE Congress on Evolutionary Computation, 10 pages.

Ferringer, Matthew P. "General Framework for the Reconfiguration of Satellite Constellations." <http://etda.libraries.psu.edu/theses/approved/WorldWideIndex/ETD-3537/index.html>, 40 pages.

Ferringer, Matthew P. et al., "Pareto-hypervolumes for the Reconfiguration of Satellite Constellations." AIAA/AAS Astrodynamics Specialist Conference and Exhibit. Aug. 18-21, 2008, p. 1-31.

Yong Tang, "Advancing Hydrologic Model Evaluation and Identification Using Multiobjective Calibration Sensitivity Analysis and Parallel Computation." ProQuest Information and Learning Company. 2007, 48 pages.

"Scott Zimmer et al., ""Utilizing Evolutionary Algorithms for Problems with Vast Infeasible Regions and Expensive Function Evaluations."" The Aerospace Corporation. Jun. 27, 2008, 12 pages."

Theodore R. Stodgell et al., "Satellite Rendezvous Tours Using Multiobjective Evolutionary Optimization." The Pennsylvania State University. 28 pages.

Joshua B. Kollat et al., "A Framework for Visually Interactive Decision-making and Design using Evolutionary Multi-objective Optimization (VIDEO)" Environmental Modelling & Software 22. 2007, 1691-1704.

Joshua B. Kollat et al., "A New Epsilon-Dominance Hierarchical Bayesian Optimization Algorithm for Large Multiobjective Monitoring Network Design Problems" Advances in Water Resources 31. 2008, 828-845.

Y. Tang et al., "Parallelization Strategies for Rapid and Robust Evolutionary Multiobjective Optimization in Water Resources Applications." Advances in Water Resources. 2006, 1-39.

"Patrick M. Reed et al. ""Parallel Evolutionary Multi-Objective Optimization on Large. Heterogeneous Clusters: An Applications Perspective."" Journal of Aerospace Computing Information and Communication. vol. 5. Nov. 2008, 460-478."

Allison Barker, "Aerospace Competes in International Global Trajectory Optimization Competition." Orbiter. vol. 48, No. 3. Mar. 27, 2008, 1 page.

Anonymous, <http://www.apptimation.com/Technology/Technology.html>, 1 page.

Matthew P. Ferringer et al.. "Efficient and Accurate Evolutionary Multi-Objective Optimization Paradigms for Satellite Constellation Design." Journal of Spacecraft and Rockets. vol. 44. No. 3, May-Jun. 2007. 682-691.

J.B. Kollat et al., "A Computational Scaling Analysis of Multiobjective Evolutionary Algorithms in Long-Term Groundwater Monitoring Applications." Advances in Water Resources. Jan. 25, 2006. 1-24.

J- B. Kollat et al., "Comparing state-of-the-art evolutionary multi-objective algorithms for long-term groundwater monitoring design." Advances in Water Resources 29 (2006): 792-807. <www.elsevier.com/locate/advwatres>.

Kalyanmoy Debet al., "Evaluating the epsilon-Domination Based Multi-Objective Evolutionary Algorithm for a Quick Computation of Pareto-Optimal Solutions." Evolutionary Computation (13)4: 501-525.

Joshua B. Kollat et al., "The Value of Online Adaptive Search: A Performance Comparison of NSGAII, epsilon-NSGAII and epsilonMOEA." Springer-Verlag Berlin Heidelberg 2005. 386-398.

Kalyanmoy Debet al., "A Fast and Elitist Multi-Objective Genetic Algorithm: NSGA-11" KanGAL Report No. 200001. 20 pages.

David A. Van Veldhuizen et al., "Considerations in Engineering Parallel Multiobjective Evolutionary Algorithms." IEEE Transactions on Evolutionary Computation. vol. 7, No. 2, Apr. 2003. 144-173.

Matthew P. Ferringer et al., "Satellite Constellation Design Tradeoffs Using Multiple-Objective Evolutionary Computation." Journal of Spacecraft and Rockets. vol. 43, No. 6, Nov.-Dec. 2006. 1404-1411.

Laumanns, Marco et al.; "Combining Convergence and Diversity in Evolutionary Multi-Objective Optimization"; 2002; Massachusetts Institiute of Technology; Evolutionary Computation 10(3); pp. 1-21.

Deb, Kalyanmoy et al.; "Omni-Optimizer: A generic evolutionary algorithm for single and multi-objective optimization"; 2006; Elsevier; European Journal of Operational Research 185 (2008); pp. 1062-1087.

Ventura, Sebastian et al.; "JCLEC: a Java framework for evolutionary computation"; 2007; Springer-Verlag; pp. 381-392.

Chuang, Angela S. et al.; "An Extensible Genetic Algorithm Framework for Problem Solving in a Common Environment"; 2000; IEEE; Transactions on Power Systems, vol. 15, No. 1; pp. 269-275.

Tan, K. C. et al.; "A Multiobjective Evolutionary Algorithm Toolbox for Computer-Aided Multiobjective Optimization"; 2001; IEEE; Transactions on Systems, Man, and Cybernetics—Part B: Cybernetics, vol. 31, No. 4; pp. 537-556.

Shajulin Benedict and V. Vasudevan, "Scheduling of Scientific Workflows Using Niched Pareto GA for Grids"; 2006, IEEE pp. 908-912.

David A. Van Veldhuizen et al., "(Final Draft) TR-98-03 Multiobjective Evolutionary Algorithm Research: A History and Analysis" Oct. 14, 1998; pp. 1-30.

Jeffrey Horn, et al.; "A Niched Pareto Genetic Algorithm for Multiobjective Optimization" 1994; IEEE; pp. 82-87.

Mark Erickson et al.; Multi-objective Optimal Design of Groundwater Remediation Systems: Application of the Niced Pareto Genetic Algorithm (NPGA); Advances in Water Resources 25 (2002); pp. 51-65.

Y. Tang et al., "Parallelization Strategies for Rapid and Robust Evolutionary Multiobjective Optimization in Water Resources Applications." Advances in Water Resources 30. 2007, 335-353.

Kirley, Michael, and Robert Stewart. "An analysis of the effects of population structure on scalable multiobjective optimizationproblems." In Proceedings of the 9th annual conference on Genetic and evolutionary computation, pp. 845-852. ACM, 2007.

Zhao, Shi-Zheng, and Ponnuthurai Nagaratnam Suganthan. "Multi-objective evolutionary algorithm with ensemble of external archives." International Journal of Innovative Computing, Information and Control 6, No. 1 (201 0): 1713-1726.

Cheng, Yu, Yongjie Jin, and Jinglu Hu. "Adaptive epsilon non-dominated sorting multi-objective evolutionary optimization and its application in shortest path problem." In ICCAS-SICE, 2009, pp. 2545-2549. IEEE, 2009.

Aguirre, Heman, and Kiyoshi Tanaka. "AdaptiveE—ranking on MNK-Landscapes." In Computational intelligence in miulti-criteria decision-making, 2009. mcdm'09. ieee symposium on, pp. 104-111. IEEE, 2009.

Walker, J. G., "Circular Orbit Patterns Providing Whole Earth Coverage," Royal Aircraft Establishment, Tech. Rept. 70211, Nov. 1970.

Ballard, A. H., "Rosette Constellations of Earth Satellites," IEEE Transactions on Aerospace and Electronic Systems, vol. AES16, No. 5, Sep. 1980, pp. 656, 665.

Draim, J. E., "Three- and Four-Satellite Continuous Coverage Constellations," Journal of Guidance, Control, and Dynamics, vol. 6, No. 6, 1985, pp. 725-730.

Chao, C., Long-Term Orbit Perturbations of the Draim Four Satellite Constellations. AIAA Journal of Guidance, Control, and Dynamics, 1992. 15(6): p. 1406-1410.

(56) References Cited

OTHER PUBLICATIONS

Chao, C. C., and Bowen, A. F., "Effects of Long-Term Orbit Perturbations and Injection Errors on GPS Constellation Values," AIAA Paper 86-2173, Aug. 1986.

Williams, E., Crossley, W., Lang, T., "Average and Maximum Revisit Time Trade Studies for Satellite Constellations using a Multi-Objective Genetic Algorithm," Advances in the Astronautical Sciences, vol. 105, Jan. 2000, p. 653.

Wallace, S., Parallel Orbit Propagation and The Analysis of Satellite Constellations. 1995, Massachusetts Institute of Technology.

Vallado, D., A., Fundamentals of Astrodynamics and Applications 2_'!d Edition, Microcosm Press, El Segundo, CA, 2001, p. 775.

Fleming, P.J., R.C. Purshouse, and R.J. Lygoe. Many-Objective Optimization: An Engineering Design Perspective. in Evolutionary Multi-Criterion Optimization. 2005. Guanajuato, Mexico: Springer Lecture Notes in Computer Science.

Thomas, J. and K.A. Cook, eds. "Illuminating the Path: The Research and Development Agenda for Visual Analytics", 2005, IEEE Computer Society Press: Los Alamitos, CA.

\* cited by examiner

SYSTEMS AND METHODS FOR OPTIMIZING SATELLITE CONSTELLATION DEPLOYMENT

FIELD OF THE DISCLOSURE

Aspects of the disclosure are related generally to satellite constellation deployment, and more particularly to systems and methods for optimizing the deployment of satellite constellations.

BACKGROUND OF THE DISCLOSURE

Building a satellite constellation may be a relatively expensive endeavor with costs at approximately $10,000 per pound. Depending on the number of satellites, deployment of certain satellite constellations may exceed capital outlays in the billions of dollars and yet the value they provide has justified the costs for those entities (e.g. nations, corporations, etc.) that have the resources required in the deployment of satellite constellations. Earth-orbiting satellite constellations serve many critical missions from delivering precise guidance and navigation to enhancing our understanding of climate change.

There is, however, a general interest in driving down the cost of satellite constellation deployment, so that a greater number of entities, such as nations, may participate in the benefits afforded by the use of satellite technology and so that the current entities exploiting satellite technology may exploit greater financial returns from their investments. Cost savings and return-on-investment (ROI) may be improved by a variety of mechanisms, including reducing the total number of satellites in the satellite constellation while achieving operational performance parameters (i.e. global coverage, revisit times, etc.), reducing the launch mass of the satellites at deployment of the satellite constellation, and increasing the operational lifetime of the satellite constellation while maintaining operation performance parameters.

For many missions, finding constellations that provide continuous coverage of the Earth using the fewest satellites is desirable. This problem has received a great deal of attention over the years, first with Easton (Easton, R. L. and Brescia, R., "Continuously Visible Satellite Constellations," NRL Rept. 6896, Apr. 30, 1969), the contents of which are incorporated herein in its entirety, providing a six-satellite solution, followed by five-satellite designs by Walker (Walker, J. G., "Circular Orbit Patterns Providing Whole Earth Coverage," Royal Aircraft Establishment, Tech. Rept. 70211, November 1970), the contents of which are incorporated herein in its entirety, and Ballard (Ballard, A. H., "Rosette Constellations of Earth Satellites," IEEE Transactions on Aerospace and Electronic Systems, Vol. AES16, No. 5, September 1980, pp. 656, 665), the contents of which are incorporated herein in its entirety. By considering elliptical orbits, Draim (Draim, J. E., "Three- and Four-Satellite Continuous Coverage Constellations," Journal of Guidance, Control, and Dynamics, Vol. 6, No. 6, 1985, pp. 725-730), the contents of which are incorporated herein in its entirety, discovered four-satellite configurations that provided continuous global coverage. Launch parameters may be specified for each of the aforementioned satellite constellation configurations. These launch parameters, as depicted in FIG. 1, may include semi-major axis (a), eccentricity (e), inclination (i), right ascension of ascending mode (a), argument of perigee (w), and mean anomaly (M).

Although Draim's initial configuration (i.e. launch parameters) provides continuous global coverage at initial deployment of the constellation, orbital perturbations, such as those shown in FIG. 2, may induce deviations from the original deployment configuration and degradation in operational performance parameters over the mission lifetime of the satellite constellation. Some of these orbital perturbations may include third-body effects of the sun and moon and the non-uniform mass distribution of the earth. To mitigate the degradation of the satellites in the satellite constellation, expensive station keeping (propellant expenditure=mass=cost) may be employed. Chao (Chao, C., Long-Term Orbit Perturbations of the Draim Four Satellite Constellations. AIAA Journal of Guidance, Control, and Dynamics, 1992. 15(6): p. 1406-1410), the contents of which are incorporated herein in its entirety, analyzed the long term perturbation effects on several Draim constellations over five and ten year periods, reporting coverage degradation of approximately 30% with no minimum elevation angle constraints and up to 60% at 10° minimum elevation angle. Counteracting the perturbations to maintain the Draim configuration through station keeping costs significant amounts of propellant.

Launch mass savings may be realized by reducing or eliminating propellant in the mass budget of the launch of a satellite constellation. In some cases, propellant used for station keeping may account for anywhere from 6% (Global Positioning System mission) to 50% (Clementine mission) of a satellite's total mass. Reducing or even eliminating the propellant required to perform a given mission may dramatically reduce the cost of a mission. The propellant costs are driven by a range of mission requirements which include station keeping, or maneuvers that provide the energy to counter undesired changes in the constellation design due to perturbing accelerations (e.g. oblate Earth, Sun, Moon, tides, relativity, etc.) to maintain predicted performance.

BRIEF DESCRIPTION OF THE DRAWINGS

Reference will now be made to the accompanying drawings, which are not necessarily drawn to scale, and wherein.

DETAILED DESCRIPTION

Embodiments of the disclosure now will be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Figure 2:
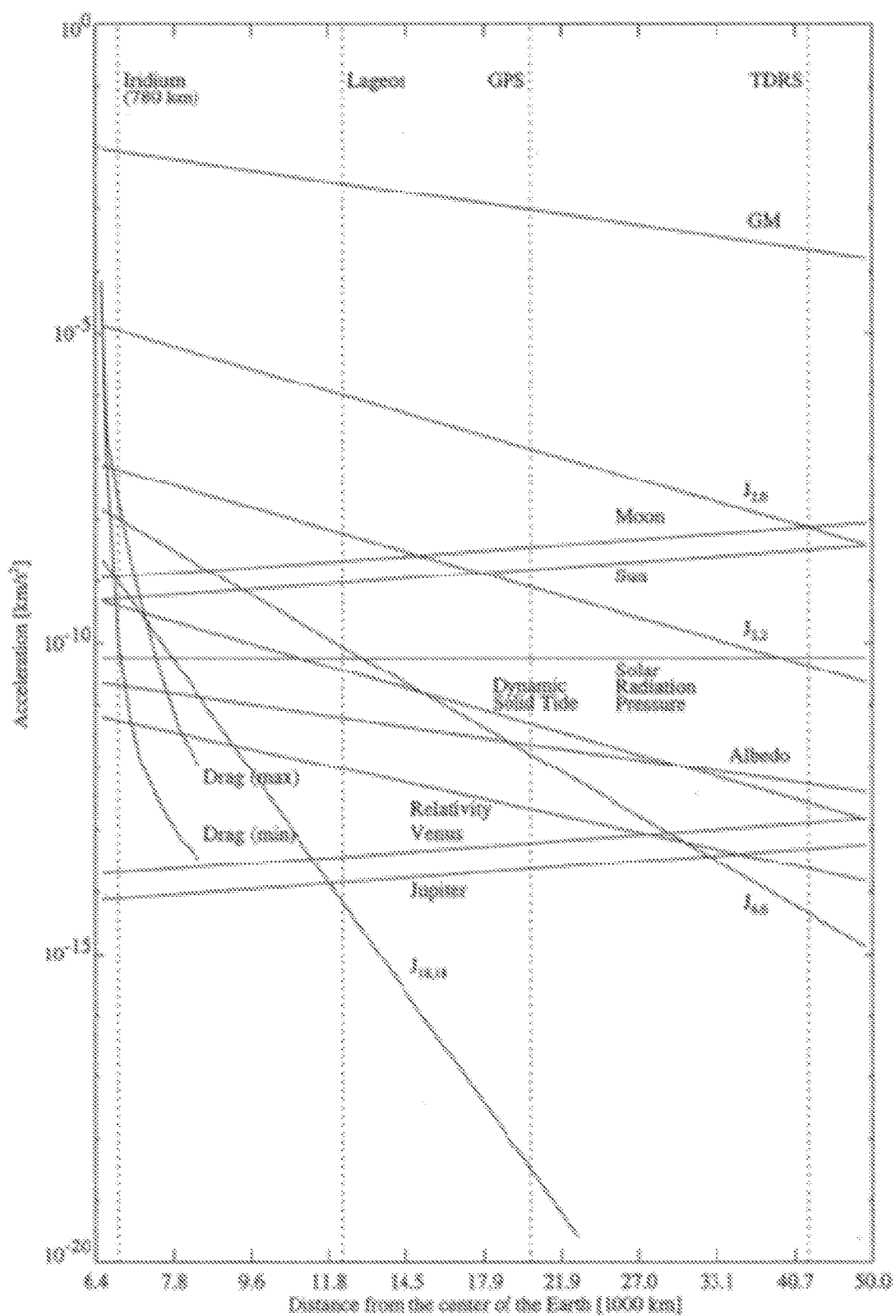
FIG. 2 is a chart that illustrates example sources and magnitudes of perturbations of satellites in an example satellite constellation, in accordance with embodiments of the disclosure.

Embodiments of the disclosure may relate to the use of naturally occurring perturbing forces to achieve a desired effect on satellite orbits of a satellite constellation. Since the perturbing forces, as shown in FIG. 2, are simply another force acting on the satellites of the satellite constellation, those perturbing forces may be used, in example embodiments, to provide relatively long-term stability to the orbits of satellites of the satellite constellation. In other words, these perturbing forces may be forces other than the constant gravitational force between the satellites of the satellite constellation and the earth or the centripetal force of the satellites of the satellite constellation resulting from the orbital motion of the satellites. These forces, in example embodiments, may include the gravitational force of the sun, the gravitational force of the moon, force due to atmospheric drag (e.g. particularly for low earth orbit (LEO) satellites), force of solar radiation, force of dynamic solid tide, force from absorption of electromagnetic radiation (Albedo effect), forces due to the oblateness of the earth (e.g. $J_{2.0}$, $J_{2.2}$, $J_{6.6}$, $J_{18.18}$), forces deviations due to relativity, and the gravitational forces of Venus, Mars, Jupiter, or other planetary bodies.

In certain example embodiments of the disclosure, the systems and methods disclosed herein may be employed to derive launch parameters that achieve passive control (i.e. no station keeping or no use of propellant to maintain orbit). In certain other example embodiments of the disclosure, the systems and methods disclosed herein may be employed to reduce the amount of propellant load required for maintaining a particular constellation's configuration. In other words, in accordance with the disclosure, initial launch parameters may be selected for the satellites of the satellite constellation, such as by discovering special initial configuration conditions of the satellites of a satellite constellation, that reduce and/or eliminate the need for station keeping while delivering performance specifications of the satellite constellation.

The systems and methods as described herein may, in example embodiments, provide a framework for efficiently understanding the design space and the trade-offs involved in selecting a relatively optimal set of initial launch parameters. It will be appreciated that the system and methods described herein may provide a relatively optimal placement of satellites of a satellite constellation in accordance with determined initial launch parameters that consider performance metrics during the entire mission lifetime of the satellite constellation, rather than just at the initial time of deployment of the satellite constellation. Therefore, in example embodiments, initial launch parameters (i.e. initial placement) of the satellites of the satellite constellation, may be determined that use the perturbing forces of the satellites to enhance the stability of the orbits of the satellites and to maintain the station (i.e. position) of the satellites. In other words, the systems and methods disclosed herein may provide satellite orbits that may harness the highly coupled, non-linear, and disturbing accelerations to the advantage of the constellation design and achieve mission goals, thereby reducing the total cost to orbit.

Figure 3:
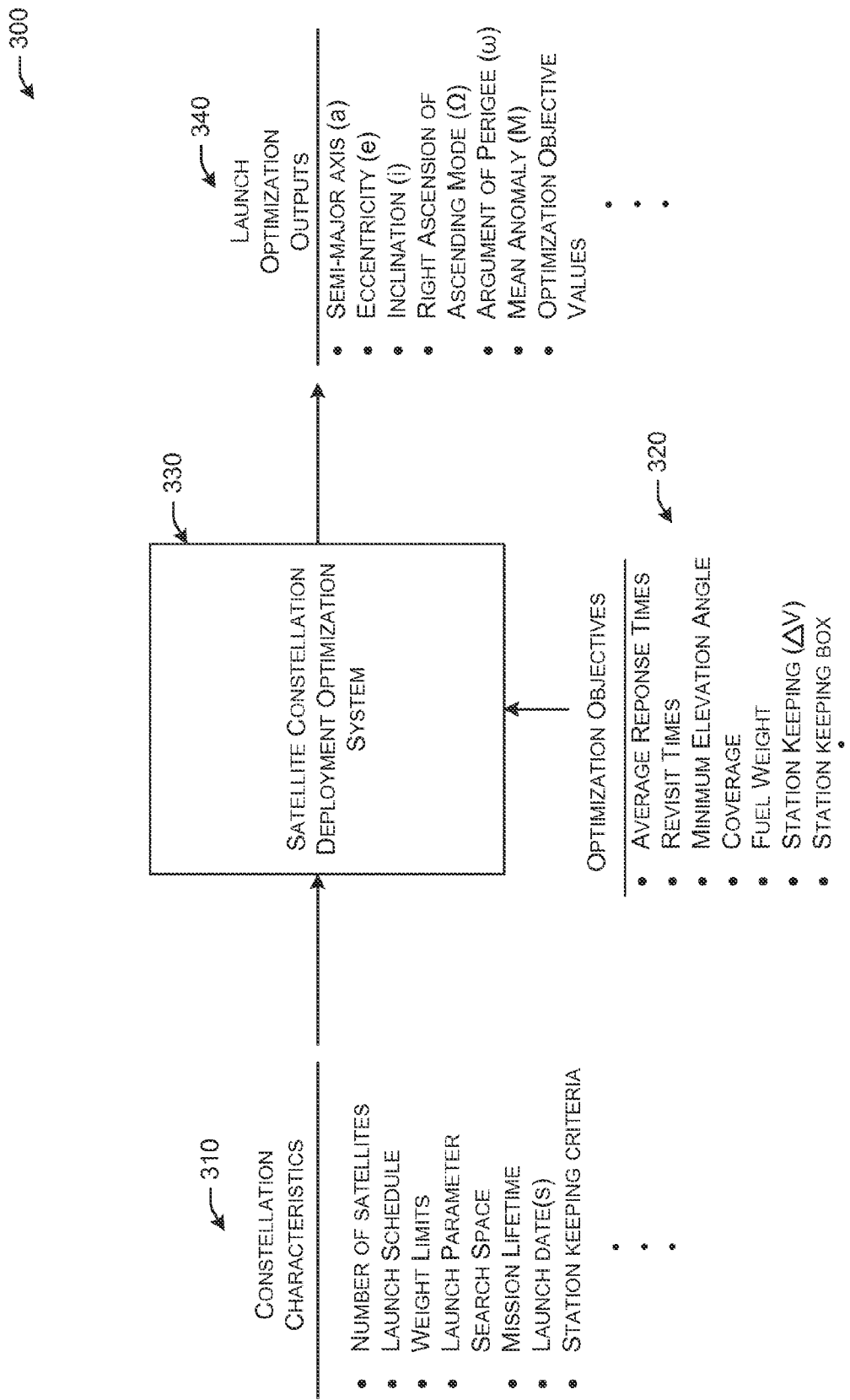
FIG. 3 is a schematic diagram that illustrates an example satellite constellation deployment optimization system showing example inputs to the satellite constellation deployment optimization system and example outputs of the satellite constellation deployment optimization system, in accordance with embodiments of the disclosure.

FIG. 3 is a schematic diagram that illustrates an example satellite constellation deployment optimization system 330 showing example inputs 310, 320 to the satellite constellation deployment optimization system 330 and example outputs 340 of the satellite constellation deployment optimization system, in accordance with embodiments of the disclosure. The inputs to the satellite constellation deployment system 330 may include constellation characteristics 310, as well as optimization objectives 320. The constellation characteristics 310 may include a variety of descriptions and/or constraints of the proposed satellite constellation. Constellation characteristics 310 may include, but are not limited to, the number of satellites in the constellation, launch schedule (i.e. times when each of the satellites of the satellite constellation are launched/deployed), the maximum weight limits of the satellites in the constellation, the launch parameter search space (i.e. the range of location where the satellites of the constellation may be placed), the mission lifetime, station keeping criteria (e.g., total Δv, station keeping fuel limits, and/or station keeping box or spatial size), combinations thereof, or the like. In some cases, the number of satellites in the constellation may be decided by factors other than the optimization objectives 320, as input into the satellite constellation deployment optimization system 330. In some cases, the number of satellites in the satellite constellation may be established by budgetary constraints of the entity that is deploying the satellite constellation. The launch schedule may also be set by a variety of factors, such as budgetary constraints, suitable launch windows, suitable weather conditions, combinations thereof, or the like. The weight limits may be established by the budgetary constraints of the entity deploying satellite constellation, lift capability limits of a launch vehicle carrying the satellite(s), or the like. The launch parameter search space may be established by orbital space available and/or allocated for the deployment of the satellite constellation by a regulatory body. In some example embodiments, the station keeping criteria may be a fixed criteria (e.g., a fixed station keeping box). In other example embodiments, one or more of the station keeping criteria may be optimized by the satellite constellation deployment optimization system 330. For example, in some cases, the station keeping box, or spatial limits within which to maintain one or more satellites of the satellite constellation, may be optimized by the multi-objective optimization mechanisms of the satellite constellation deployment system 330. In another example, the amount of fuel for performing station keeping maneuvers of one or more satellites of the satellite constellation may be optimized by the multi-objective optimization mechanisms of the satellite constellation deployment system 330. In example embodiments where station keeping box is optimized, a subset of satellite parameters may be kept in control. For example, any subset of the semi-major axis, eccentricity, inclination, right ascension of ascending mode, argument of perigee, mean anomaly, or relative phase may be controlled by station keeping. In example embodiment, any one or more of the aforementioned satellite parameters may be optimized for a particular satellite of the satellite constellation for which an optimization is performed by the satellite constellation deployment system 330.

The optimization objectives 320 may specify elements that the mechanism performed by the satellite constellation deployment optimization system 330 optimizes. The optimization objectives 330 may include, but are not limited to, minimizing average response times, minimizing revisit times of the satellites on any given point on earth, maximize minimum elevation angle (i.e. the angle above the horizon from any given point on earth where the satellite is considered in view of the point), coverage of the earth, fuel weight, station keeping (i.e. total change in velocity of the satellite ($\Delta V$)), combinations thereof, or the like. In example embodiments of the disclosure, two or more optimization objectives may be optimized simultaneously to arrive at an optimized initial set of launch parameters. Example embodiments of the disclosure may provide a non-dominated solution, where the non-dominated solution is a set of launch parameters 340 (i.e. the six defining positional placement parameters for each satellite of the satellite constellation) that provide satellite constellation performance that is no worse than any other set of launch parameters for each of the optimization objectives that are evaluated.

The example output of the satellite constellation deployment optimization system 330 may be initial launch parameters 340, or the six defining positional placement parameters where the satellites are initially placed for each satellite of the satellite constellation. These initial launch parameters may include, but are not limited to, the semi-major axis (a), eccentricity (e), inclination (i), right ascension of ascending mode ($\Omega$), argument of perigee ($\omega$), and mean anomaly (M) for each of the satellites of the satellite constellation and thereby, define the initial placement of each of the satellites. According to example embodiments of the disclosure, these initial launch parameters 340 may be the elements that are optimized by the satellite constellation deployment optimization system 330 based on the optimization objectives 320. It should be appreciated that the optimization objectives 320 to which the optimization is performed may be selected from the list shown, but may not in every instance include all of the optimization objectives shown for the optimization of the initial launch parameters 340. In example embodiments, two or more of the optimization objectives 320 may be considered in optimizing for the initial launch parameters 340 of a satellite constellation. For example, minimizing the average response time, minimizing the maximum revisit time, and maximize the minimum elevation may be used as three optimization objectives in designing a particular satellite constellation. In this case, the optimization performed by the satellite constellation deployment optimization system 330 may provide a solution in the form of optimized initial launch parameters 340 that are no worse than a plurality of sets of launch parameters evaluated during the optimization process, as described herein, with regards to the three aforementioned optimization objectives 320. In a different non-limiting example satellite launch parameter optimization, the optimization objectives selected may include minimizing revisit times and minimize station keeping ($\Delta V$). In example embodiments, the output 340 may further include one or more objective values as determined during the optimization of initial launch parameters by the satellite constellation deployment optimization system 330. For example, these objective values may present the achieved objective values (e.g., revisit time, coverage, etc.) for the optimized initial launch parameters.

Figure 4:
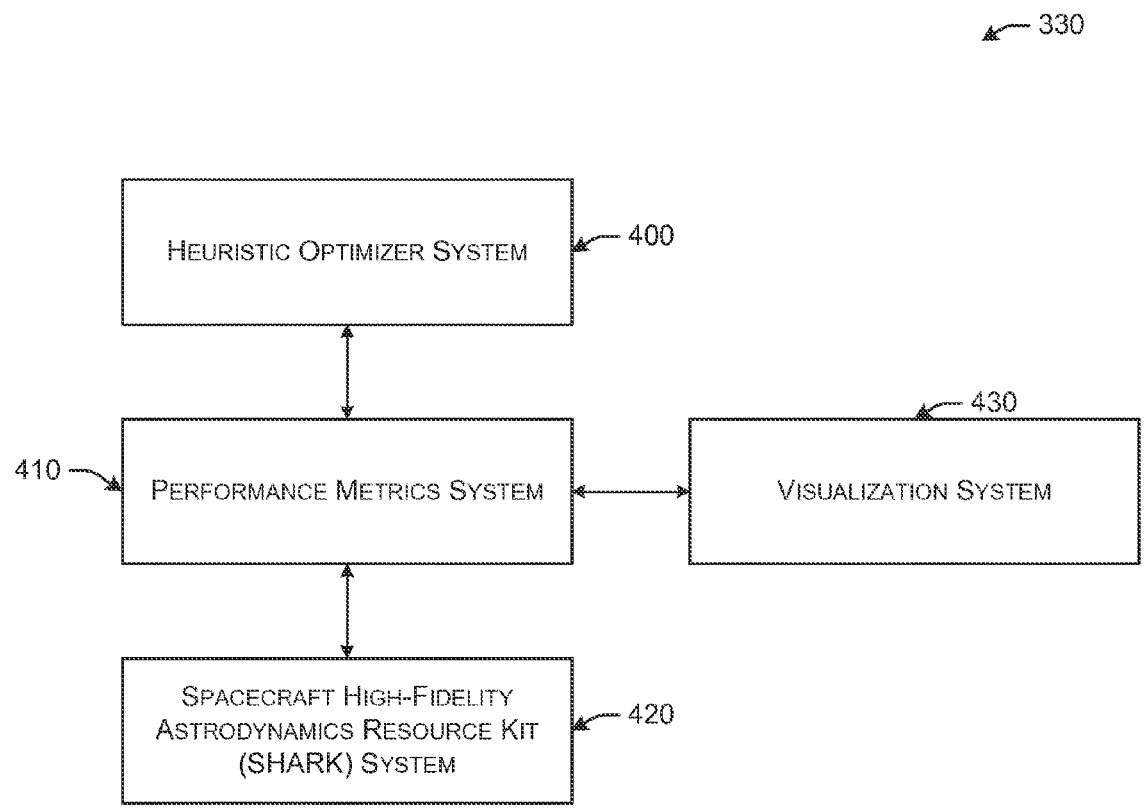
FIG. 4 is a block diagram that illustrates example components of the satellite constellation deployment optimization system of FIG. 3, in accordance with embodiments of the disclosure.

FIG. 4 is a block diagram that illustrates example components of the satellite constellation deployment optimization system 330 of FIG. 3, in accordance with embodiments of the disclosure. As depicted, the satellite constellation deployment optimization system 330 may include a heuristic optimizer system 400, a performance metric system 410, a spacecraft high-fidelity astrodynamics resource kit (SHARK) system 420, and a visualization system 430. The coupling of the SHARK system 420 with the performance metric system 410 enables relatively reliable, accurate, and precise determination of performance parameters and/or metrics, such as coverage performance, revisit times, average response times, minimum elevation angles, and station keeping ($\Delta V$). The coupling between the heuristic optimizer system 400 and the performance metric system 410 enables evaluation of performance metrics at a plurality of sample initial launch parameters, and the evaluation thereof. The heuristic optimizer system 400, therefore, is configured to request and receive performance metrics associated with a particular set of initial launch parameters to be evaluated from the performance metrics system 410 and/or the SHARK system 420. Therefore, in example embodiments, the satellite constellation deployment optimization system 330 may include performance metric models, as evaluated by the performance metrics system 410, satellite high-fidelity satellite motion models, as evaluated by the SHARK system 420, a search and optimization mechanism, as embodied in the heuristic optimizer system 400, and a visual analytics and result(s) evaluation mechanism, provided by the visualization system 430, all of which are configured to operate in either a serial or parallel processing environment.

The SHARK system 420 may be configured to perform high-fidelity propagation of satellite orbits by accounting for substantially all significant orbital perturbations, as shown in FIG. 2. In other words, the SHARK system 420 may be configured to determine the location of any given satellite of a satellite constellation at any time after the deployment of the satellite constellation and before the end of the mission lifetime of the satellite constellation. In yet other words, the SHARK system 420 may be configured to receive a temporal coordinate associated with an initial set of launch parameters and provide a set of spatial coordinates corresponding to the received temporal coordinate for one or more of the satellites of the satellite constellation being evaluated. Furthermore, as discussed above, the SHARK system 420 may be configured to predict a satellite's motion as a function of time in the presence of a user-selectable set of perturbations, including the disturbing acceleration due to the Earth's oblate shape, atmospheric drag, solar radiation pressure, gravitational effects of the Sun and Moon, and nutation/precession of the Earth. The perturbation equations that describe the time rates of change of the orbital position can be derived from Newton's Universal Law of Gravitation by treating each perturbation (e.g., oblate Earth, drag, etc.) as a disturbing acceleration in the equations of motion. The SHARK system 420 integrates these equations to accurately predict satellite positions and velocities over decadal time scales.

In example embodiments, to increase the efficiency of providing the motion of the satellites in the satellite constellation over the mission lifetime, such as years or decades, the SHARK system 420 may be configured to determine the motion of the satellites for any given initial launch parameter set over one or more single orbits, or portions thereof, based on the laws of motion (i.e. Newton's Universal Law of Gravitation, Kepler's Laws of Planetary Motion, etc.) and fit the motion of each of the satellites to one or more polynomials. Therefore, according to example embodiments, the SHARK system 420 may determine a portion of the motion of a satellite, during a portion of time within the mission lifetime of the satellite by applying Newton's Universal Law of Gravitation and then fitting the results to one or more polynomial functions, such as Chebyshev functions. The SHARK system may further be configured to store the fitting coefficients associated with the one or more polynomials associated with a satellite with a particular initial launch parameters in an orbit table, such as in a memory device and/or database, for relatively quick access and use. The SHARK system 420, therefore, in these embodiments, may be configured to determine the motion of the satellite by utilizing the fitted polynomials, rather than solve the more complex Newton's Universal Law of Gravitation each time a satellite location and/or motion is requested. In other words, the SHARK system 420, to more efficiently (i.e. using fewer computational resources) and/or to more quickly provide location and/or motion information regarding a particular satellite within a suitable level of error, extrapolate and/or interpolate the location of the satellite using the one or more fitted polynomials, such as fitted Chebyshev functions.

The SHARK system 420 may also be configured to determine when, where, and on what satellite station keeping ($\Delta v$) may be required. In example embodiments, this may be determined by receiving and/or identifying a spatial region within which a particular satellite is to remain and determining when and/or where the particular satellite may move outside of the allowable spatial region by the SHARK system 420. In further example embodiments, the SHARK system 420 may determine if a satellite goes out of allowable bands of its station location. If or when the satellite goes outside of its station bounds, the SHARK system may recognize that station keeping ($\Delta v$) is needed to restore the satellite within the allowable bands of its station (i.e. launch) parameters. When station keeping is required, the SHARK system 420 may maintain a log of the times and locations of the $\Delta v$ and/or a running total $\Delta v$. The coordinates (i.e. spatial and/or temporal) where station keeping is implemented may present additional discontinuities and/or non-linearities in the models, such as the fitted polynomials, utilized by the SHARK system 420 for rapid determination of satellite locations. In some example case, such as for $\Delta v$, the SHARK system 420 may be configured to provide performance parameters directly or via the performance metrics system 410 to the heuristic optimizer system 400.

In the framework of the satellite constellation deployment optimization system 330, the SHARK system 420 is configured to transmit high-fidelity state vector information from simulation(s) to the performance metrics system 410, which in turn, is configured to determine performance metrics, such as ground coverage related performance metrics. The performance metrics system 410 is further configured to transmit performance metrics to the heuristic optimizer system 400. The performance metrics system may be configured to determine the visibility to one or more ground locations and compute coverage statistics for multi-constellation, multi-sensor, multi-constraint satellite architectures. Several of the most common metrics calculated by performance metrics system 410 are maximum coverage gap, mean coverage gap, percent coverage, daily visibility time and mean response time. Generally, the initial goal of any constellation design is to maximize coverage which may require accurately predicting satellite motion as a function of time in the presence of relevant disturbing forces. The coupling of the performance metrics system 410 and the SHARK system 420 enable this capability. It should further be appreciated that since the SHARK system 420 is configured to consider one or more perturbations to the orbit of satellites in a satellite constellation, the performance metrics system 410 may be configured to provide performance metrics that take into consideration the one or more perturbations to the orbit of the satellites of the satellite constellation under optimization.

In example embodiments of the disclosure, the performance metrics system 410 may be configured to consider a plurality of points on the surface of the earth, such as, for example 408 points on the surface of the earth. At this plurality of points, the performance metrics system 410 may cooperate with the SHARK system 420 to determine the rise and set time, such as with a minimum elevation angle, of each satellite of the satellite constellation. In example embodiments, the performance metrics system 410 may be configured to establish the points on the surface of the earth based at least in part on user input. In other words, an operator of the satellite constellation deployment optimization system 330 may provide the points for evaluation of performance metrics to the performance metrics system 410, such as via one or more user interfaces of the satellite constellation deployment optimization system 330 and/or the performance metrics system 410. In some cases, the points of evaluation on the surface of the earth may be evenly (i.e. may be substantially equally separated from each other spatially). In other cases, the plurality of points considered for determining performance metrics may not be evenly spaced (i.e. some of the plurality of points may be more closely spaced than others of the plurality of points). In example embodiments, the performance metrics system 410 may be configured to determine individual performance, such as coverage performance, revisit times, or the like, at each of the plurality of points for a particular set of initial launch parameters, such as initial launch parameters provided by the heuristic optimizer system 400 to be evaluated, by interacting with the SHARK system 420. The performance metric system 410 may further be configured to aggregate the performance determined for the plurality of points, such as by determining averages, minima, maxima, or the like. These aggregated performance metrics may be provided by the performance metrics system 410, responsive to a request for performance metrics from the heuristic optimizer system 400 at a particular set of initial launch parameters to be evaluated in the process of determining optimized launch parameters by the satellite constellation deployment optimization system 330. It will be appreciated that in example embodiments, a plurality of areas on the surface of the earth may be used instead of a plurality of points on the surface of the earth.

In example embodiments, the performance metrics system 410 may be configured to solicit the position of particular satellites of the satellite constellation from the SHARK system 420 at particular times within the service lifetime of the satellite constellation. By doing so, the performance metrics system 410 may be configured to ascertain when a particular satellite "rises" and "sets" at a particular one of the points established on the surface of the earth by the performance metrics system 410. The performance metrics system 410 may be configured to use this type of process, by soliciting positional and or motion information regarding satellites of the satellite constellation to generate a vector of rise and set times within the mission lifetime of the satellite constellation for each of the satellites. The performance metrics system 410 may further be configured to use the set of rise and set times at each of the plurality of points on the earth (or in other embodiments, areas on the earth) to determine the performance metrics associated with a particular set of initial launch parameters to be evaluated by the heuristic optimizer system 400.

The heuristic optimizer system 400 may be implemented to embrace the paradigm of many-objective optimization which refers to designing a system with respect to more than one criteria (e.g. four criteria or optimization objectives) in a way that allows engineers to elucidate conflicts or tradeoffs between those criteria. Most complex engineered systems and in particular, the deployment of satellite constellations, are best characterized by multiple criteria that should be considered independently of one another and still concurrently with each other in order to avoid a priori conjectures regarding their relationships. This is especially true for constellation design problems where interactions among the dominant perturbing forces are complex and hard to predict. Many-objective optimization not only allows us to independently quantify the various coverage criteria but also allows us to do this in a way that minimizes simplifying assumptions. The goal of multiple-objective optimization, in contrast to the single-objective optimization case where the global optimum is desired (except in certain multimodal cases), is to maximize or minimize multiple measures of performance simultaneously whereas maintaining a diverse set of Pareto-optimal solutions. The concept of Pareto optimality refers to the set of solutions in the feasible objective space that is non-dominated. A solution is considered to be non-dominated if it is no worse than another solution in all objectives and strictly better than that solution in at least one objective. Consider a situation where both f1 and f2 objectives are to be minimized, but where the two objectives are in conflict, at least to some extent, with each other. Because both objectives are important, there cannot be a single solution that optimizes the f1 and f2 objectives; rather, a set of optimal solutions exists which depict a tradeoff.

As a non-limiting example, the heuristic optimizer system 400 may be configured to evaluate and optimization where constellation coverage is traded against minimum ground elevation angle. Depending on the mission, satellite constellations generally operate at or above a minimum elevation angle. In most cases, coverage performance would conflict with the minimum elevation angle, or in other words, it becomes increasingly difficult to improve coverage performance as the desired minimum elevation angle increases. When conflicts like this exist, there may not be a single optimal constellation, but rather a suite of optimal design possibilities that the decision maker may then choose from in order to achieve an acceptable compromise design. However, it is this very conflict that is useful to a decision maker in that it provides a context for understanding the relationship between coverage and elevation angle. Discovering the nature of the tradeoffs, as afforded by the heuristic optimizer system 400, is extremely important, because it allows for informed design decisions, and for understanding the impact of those decisions. It will, therefore, be appreciated that the frame work of the satellite constellation deployment optimization system 330 with the heuristic optimizer system 400 may enable the search for initial launch parameters that improve long-term performance using multiple dominant perturbations to the orbits of the satellites of the satellite constellation. Furthermore, the methods employed by the heuristic optimizer system 400 may be a non-iterative mechanism and therefore may provide optimal solutions for minimizing and/or harnessing the perturbing effects as discussed herein for situations where an iterative method may not lead to an optimal solution.

In some example embodiments, the heuristic optimizer system 400 may be an evolutionary algorithm system, such as those described in at least U.S. Pat. Nos. 8,255,344 and 8,285,653, both of which are incorporated herein, in their entirety by reference. The evolutionary algorithm system may employ techniques of biologic natural selection to efficiently search a multi-objective optimization space that may not be amenable to search by analytic, iterative, or other methods. In example embodiments, the search variables, such as the initial launch parameters of the satellites of the satellite constellation, may be organized as a data structure that resembles genes in a chromosome. Upon organizing the search variable, the heuristic optimizer system 400 may proceed to generate child chromosomes, from parent chromosomes. Therefore, in example embodiments, the "children" to evaluate in any given generation may be based, at least in part on the "parents" or a subset thereof, from the previous generation. The heuristic optimizer system 400 may be configured to evaluate the chromosomes (i.e. launch parameters evaluated) from any given generation, based at least in part on the corresponding respective performance on the multiple objectives that are being used to evaluate the initial launch parameters of the satellite constellation. The heuristic optimizer system 400, in the form of the evolutionary algorithm system, may further be configured to select those chromosomes that display the best performance according to the multiple objectives, in any given generation and use those chromosomes to generate children by crossover. Crossover may introduce diversity, while preserving as-yet known advantageous genes, into the population of solutions to be evaluated and considered within the search space to arrive at an optimal solution. The heuristic optimizer system 400, in the form of the evolutionary algorithm system, may further be configured to introduce mutations (i.e. random or pseudo-random changes in one or more genes of a child chromosome) to introduce further diversity of potential solutions within the search space for the purposes selecting a relatively optimized solution set (i.e. optimized launch parameters) in accordance with the identified objectives of the optimization.

It can be seen that the mechanisms used by the heuristic optimizer system 400 (e.g., genetic operators, selection, crossover, mutation, etc.), particularly in the form of an evolutionary algorithm system, are not mechanisms that are limited to arrive at a convergence in an iterative fashion. Indeed, the mechanism is one that employs intelligent "hopping around" and evaluating according to optimization objectives, rather than a convergence mechanism. It will be appreciated that such as framework may be amenable to solving multi-objective, multi-dimensional, and/or highly constrained problems, where relative pockets of "good performance" and/or optimized performance according to the optimization objectives may not always be contiguous. In these types of problems, analytical methods (e.g. Lagrange multipliers, etc.), iterative convergence methods (e.g. Newton's method, etc.), and/or methods that rely on relatively high degree of a priori knowledge of trade-offs in the search space may not be as effective at arriving at an optimized solution as the heuristic optimizer system 400, such as an evolutionary algorithm system, as described herein. Although the heuristic optimizer system 400 is discussed herein in the context of an evolutionary algorithm system, it will be appreciated that the heuristic optimizer system 400 may be any suitable system for implementing a heuristic optimization, such as, but not limited to Monte Carlo methods, extremal optimization (EO) methods, etc. It will be appreciated that the framework, described herein, overcome key limitations of other systems and methods, including providing tailored instances, harnessing specific perturbations to achieve a desired effect, evaluation thereof, and design based thereon and providing searching for initial launch parameters that improve long-term performance by using multiple dominant perturbations in an analysis that is not merely iterative and therefore, may provide optimal solutions for minimizing and/or harnessing the perturbing effects on the satellites of the satellite constellation.

It will be appreciated that the framework presented herein as the satellite constellation deployment optimization system 330 is configured to characterize trade-offs for the passive control constellation design problem (i.e. orbits are maintained by optimizing and/or harnessing the effects of the accelerating perturbations), as well as trade-offs associated with active station keeping (i.e. $\Delta v$). For example, situations where a purely passive control is not possible, may require active station keeping, or thrust produced by oxidizing propellant to maintain and/or restore orbits of satellites that may be outside a threshold condition. Therefore, the systems and methods as disclosed herein, and embodied as the satellite constellation deployment optimization system 330 may be configured to account for station keeping costs for the situations where no special initial conditions can be found that provide the required performance over mission life. This station keeping cost ($\Delta v$) may be optimized for simultaneously with other optimization objectives (i.e. revisit times), in accordance with example embodiments of the disclosure. As a result, the framework, as disclosed herein, may incorporate an additional objective function that models general station keeping maneuvers. These maneuvers may maintain the specified orbital parameters within a minimum and maximum value. A constellation designer may wish to select particular orbital parameters to control and provide a control range for control of each of the parameters that are to be maintained by station maneuvers. For example, the constellation designer might wish to control the inclination to 31°±1°. With this control enabled, if the inclination grows to 32° (or falls to 30°), then a maneuver may be performed to reduce (or increase) the inclination to the nominal target. This type of spatial control is available for the semi-major axis, perigee radius, inclination, and argument of perigee. Furthermore, the orbital maintenance cost associated with the relative phasing (i.e. in-track orbit position of spacecraft A with respect to the in-track position of spacecraft B) may be determined and/or provided. This expended $\Delta v$ may be added to that calculated as a result of the other control maneuvers and the total used as an optimization objective to minimize in the multi-objective framework, as disclosed herein. The resulting optimization, may provide a use-case of the system disclosed herein, that may provide a complete propellant cost versus performance characterization of the passive control and/or minimum expended energy-active control design trade-off decisions.

Figure 5:
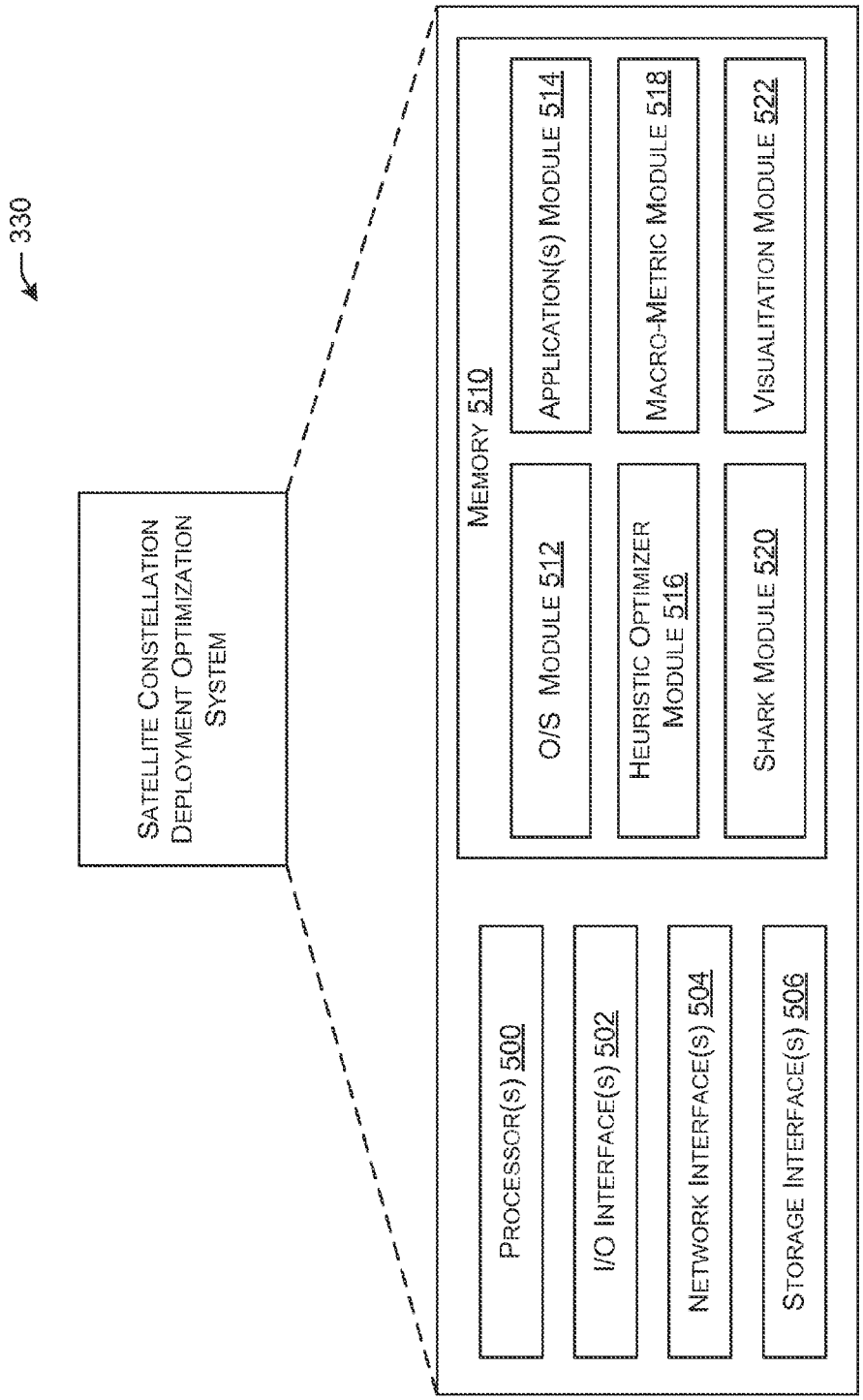
FIG. 5 is a block diagram that illustrates an example implementation of the satellite constellation deployment optimization system of FIG. 3, in accordance with embodiments of the disclosure.

FIG. 5 is a block diagram that illustrates an example implementation of the satellite constellation deployment optimization system 330 of FIG. 3, in accordance with embodiments of the disclosure. The satellite constellation deployment optimization system 330 may include one or more processors 500, one or more I/O device interfaces 502, one or more network interface(s) 504, one or more storage interface(s) 506, and one or more memories 510. It should be noted that this example embodiment, illustrates the satellite constellation deployment optimization system 330 as an integrated system, where each of the components (i.e. heuristic optimizer system 400, performance metrics system 410, SHARK system 420, and the visualization system 430) may share the same resources, such as the processors 500, the I/O device interfaces 502, the network interface(s) 504, the one or more storage interface(s) 506, and the one or more memories 510.

In some example embodiments, the processors 500 of the satellite constellation deployment optimization system 330 may be implemented as appropriate in hardware, software, firmware, or combinations thereof. Software or firmware implementations of the processors 500 may include computer-executable or machine-executable instructions written in any suitable programming language to perform the various functions described. Hardware implementations of the processors 500 may be configured to execute computer-executable or machine-executable instructions to perform the various functions described. The one or more processors 500 may include, without limitation, a central processing unit (CPU), a digital signal processor (DSP), a reduced instruction set computer (RISC), a complex instruction set computer (CISC), a microprocessor, a microcontroller, a graphical processor unit (GPU), a field programmable gate array (FPGA), or any combination thereof. The satellite constellation deployment optimization system 330 may also include a chipset (not shown) for controlling communication between the one or more processors 500 and one or more of the other components of the satellite constellation deployment optimization system 330. The one or more processors 500 may also include one or more application specific integrated circuits (ASICs) or application specific standard products (ASSPs) for handling specific data processing functions or tasks.

The input/output (I/O) device(s) such as display screen(s), touch sensitive display screen(s), speaker(s), haptic device(s), or the like, may be controlled via the one or more I/O device interfaces 502. These I/O device(s) may be used by the satellite constellation deployment optimization system 330 to receive user input, such as constellation characteristics 310 and/or optimization objectives 320. These I/O device(s) may further be used by the satellite constellation deployment optimization system 330 to provide user output, such as initial launch parameters 330. The network interfaces(s) 504 may allow the satellite constellation deployment optimization system 330 to communicate via one or more networks and/or via other communicative channels. The satellite constellation deployment optimization system 330 may, therefore, be configured to access one or more remote servers, cloud servers, and/or cloud storage resources. The storage interface(s) 506 may enable the satellite constellation deployment optimization system 330 to read and/or write to any variety of datastores.

The memory 510 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 510 may store program instructions that are loadable and executable on the processor(s) 500, as well as data generated or received during the execution of these programs. Turning to the contents of the memory 510 in more detail, the memory 510 may include one or more operating systems (O/S) 512, an applications module 514, an heuristic optimizer module 516, a performance metric module 518, a SHARK module 520, and an visualization module 522. Each of the modules and/or software may provide functionality for the satellite constellation deployment optimization system 330, when executed by the processors 500. The modules and/or the software may or may not correspond to physical locations and/or addresses in memory 510. In other words, the contents of each of the modules 512, 514, 516, 518, 520, 522 may not be segregated from each other and may, in fact be stored in at least partially interleaved positions on the memory 510.

The O/S module 512 may have one or more operating systems stored thereon. The processors 500 may be configured to access and execute one or more operating systems stored in the (O/S) module 512 to operate the system functions of the satellite constellation deployment optimization system 330. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 514 may contain instructions and/or applications thereon that may be executed by the processors 500 to provide one or more services. These instructions and/or applications may, in certain aspects, interact with the (O/S) module 512 and/or other modules of the satellite constellation deployment optimization system 330. The applications module 514 may have instructions, software, and/or code stored thereon that may be launched and/or executed by the processors 500 to execute one or more applications and functionality associated therewith. These applications may include, but are not limited to, functionality such as web browsing, business, communication, graphics, word processing, publishing, spreadsheets, databases, gaming, education, entertainment, media, project planning, engineering, drawing, or combinations thereof. In certain embodiments, the applications that are stored in the applications module 514 and executable by the processors 500 may provide satellite constellation optimization functionality, such as accepting user input, determining optimized or near-optimized satellite launch parameters, presenting trade-offs in the performance parameters for a set of pareto-optimal solutions, or the like.

The heuristic optimizer module 516 may have instruction stored thereon that when executed by the processors 500, configure the satellite constellation deployment optimization system 330 to perform a variety of functions associated with receiving user input and orchestrating an optimization of satellite launch parameters within a specified parameter space. In example embodiments, the processes enabled by the instructions stored in the heuristic optimizer module 516 may be configured to interact with the processes enabled by the performance metric module 518 and/or the SHARK module 520 to perform an optimization of the initial launch parameters of the satellite constellation to be optimized. In further example embodiments, the processes enabled by the instructions stored in the heuristic optimizer module 516 may be configured to interact with the processes enabled by the visualization module 522 to output optimization results of the initial launch parameters of the satellite constellation or to display trade-offs in the optimization objectives for various satellite constellation designs.

The processors 500, by executing instructions stored in the heuristic optimizer module 516 may be configured to organize initial launch parameters in data arrays, also referred to as chromosomes, with individual data elements, also known as genes, that correspond to initial launch parameters of each of the satellites of a satellite constellation to be designed and/or optimized. The processors 500 may further be configured to store these chromosomes in memory 510 or other databases for access, evaluation, and to derive further chromosomes within the search space for evaluation. In one aspect, the processors 500 may be configured to store the chromosomes, or set of initial launch parameters, that are viable (i.e. provide solutions that are physically implementable). In another aspect, the processors 500 may be configured to store only a subset of the viable chromosomes from any given generation, or partial generation. For example, the processes enabled by the instructions stored in the heuristic optimizer module 516 may only store a predetermined number of the best chromosomes and/or solutions and/or initial launch parameters (i.e. the chromosomes that correspond to the best performance and/or pareto-performance with regard to the optimization objectives selected for optimization of the satellite constellation).

In one sense, the "best" chromosomes from any given generation may be thought of as the "individuals" that are "most fit for survival." Therefore, these "most fit for survival" chromosomes may be "mated" to generate the next generation of chromosome, or initial launch conditions, for evaluation. In other words, stored chromosomes from a previous generation may be applied to one or more crossover processes, by the processors 500 enabled by the instructions stored in the heuristic optimizer module 516, to generate a new generation of chromosomes for evaluation. The child (ren) chromosome generated form a subset of the parent chromosomes, such as by selection and crossover, from the previous generation may result in a relatively high likelihood of relatively good performance on the optimization metrics of the heuristic evaluation. Additionally, the processors 500 may be configured to perform mutations, or otherwise inject random variation of one or more genes of a particular chromosome, to generate additional diversity of initial launch parameters to evaluate for the purposes of optimization. It should be noted that the optimization metrics of the heuristic optimizer processes may, in certain example embodiments, be the same as the performance metrics determined by the performance metrics system 410 and/or the SHARK system 420. In other example embodiments, the one or more of the optimization metrics may each be a combination two or more of the performance metrics determined by the performance metrics system 410. It should further be noted that, in certain example embodiments, the evaluation, both for viability and/or optimization objective performance, may be done asynchronously. In other words, there may be a "blurring of generations" as in the case of biological systems. Therefore, parent chromosomes may be used to generate child chromosomes for evaluations, by processes such as selection, cross over, and mutation, while other chromosomes are still in the process of being evaluated.

The processors 500, by executing instructions stored in the heuristic optimizer module 516 may be configured to request performance metrics of chromosomes (i.e. initial launch parameters) to be evaluated for optimization of initial launch parameters of the satellite constellation from the processes enabled by the performance metrics module 518 and/or the SHARK module 520. In this way, the processes implemented by the processors 500 by executing the instructions in the heuristic optimizer module 516 may entail determining initial launch parameters to evaluate, based at least in part on the performance of other initial launch parameter sets evaluated, and then request performance metrics for those initial launch parameters to evaluate. Responsive to the request for the performance metrics for initial launch parameters to be evaluated, the processors 500 may receive the requested performance metrics from the processes enabled by the performance metrics module 518 and/or the SHARK module 520. These received performance metrics may then be used by the processors to evaluate optimization objective, which in some example embodiments, may be the same as the received performance metrics. By evaluating a plurality of initial launch parameters based at least in part on their corresponding respective performance metrics and/or optimization objectives, the processors 500 may be configured to identify a non-dominated solution set of initial launch parameters for the satellite constellation under design. As discussed above, this satellite constellation design may be relatively optimized for a variety of optimization objectives, such as objectives selected by the constellation designer. For example, optimization may be performed for minimizing revisit times while maximizing minimum elevation angles. As another example, optimization may be performed to minimize Δv, minimizing revisit times, and minimizing average response times, for a fixed minimum threshold elevation angle. Also, as discussed above, the satellite constellation design may be relatively optimized while considering a variety of perturbing accelerations to the satellites of the satellite constellation, such as perturbing accelerations selected for consideration by the designer of the satellite constellation.

While the processes enabled by the heuristic optimizer module 516 may be implemented on single core/processor 500 systems 400, these processes may alternatively be implemented on parallel processing systems, such as massively parallel systems 400. Some of these massively parallel systems 400 may have well over 100,000 computing cores/processors 500 and may achieve computing benchmarks in the range of teraFLOPs (one-trillion floating point operations per second), petaFLOPs (one quadrillion floating point operations per second), or exaFLOPs (one quintillion floating point operations per second). In one aspect, while the operations of the heuristic optimizer module 516 are configured to be performed on one or more processors 500, other processors 50 may be configured to execute processes to evaluate the performance metrics and/or optimization objectives associated with each of the chromosomes (i.e. initial launch parameters) to be evaluated. In some cases, the evaluation may be performed by executing the processes of the performance metric module 518 and/or the SHARK module 520 on one or more of the processors 500.

The performance metric module 518 may have instruction stored thereon that when executed by the processors 500, configure the satellite constellation deployment optimization system 330 to perform a variety of functions for providing performance metrics responsive to a request for performance metrics associated with a particular set of initial launch parameters. In example embodiments, the processes enabled by the instructions stored in the performance metrics module 518 may be called upon by the processes in the heuristic optimizer module 516 to provide a specified set of performance metrics for a set of initial launch parameters under evaluation by the processes enabled by the heuristic optimizer module 516.

In example embodiments of the disclosure, the processors 500, by executing the instructions stored in the performance metrics module 518 may be configured to consider a plurality of points on the surface of the earth, such as, for example 408 different points on the surface of the earth. At this plurality of points, the processes enabled by the instructions stored in the performance metrics module 518 may cooperate with the processes enabled by the SHARK module 520 to determine the rise and set time, such as with a specified minimum elevation angle, of each satellite of the satellite constellation.

In example embodiments, the processes of the performance metrics module 518 may be configured to establish the points on the surface of the earth based at least in part on user input, such as user input that may be received via processes enabled by the heuristic optimizer module 516 and/or the visualization module 522. In other words, an operator of the satellite constellation deployment optimization system 330 may provide the points for evaluation of performance metrics to the processes enabled by the performance metrics module 518 and implemented by the processors 500, such as via one or more user interfaces of the satellite constellation deployment optimization system 330. In some cases, the points of evaluation on the surface of the earth may be evenly (i.e. may be substantially equally separated from each other spatially). In other cases, the plurality of points considered for determining performance metrics may not be evenly spaced (i.e. some of the plurality of points may be more closely spaced than others of the plurality of points). In example embodiments, the processors 500 may be configured to determine individual performance, such as coverage performance, revisit times, or the like, at each of the plurality of points for a particular set of initial launch parameters, such as initial launch parameters provided by the processes enabled by instructions stored in the heuristic optimizer module 516 to be evaluated, by interacting with the processes enabled by the instructions stored in the SHARK module 520. The processes enabled by the performance metric module 518 may further be configured to aggregate the performance determined for the plurality of points, such as by determining averages, minima, maxima, or the like. These aggregated performance metrics may be provided by the processes enabled by the performance metrics module 518, responsive to a request for performance metrics from the processes enabled by the heuristic optimizer module 516 at a particular set of initial launch parameters to be evaluated in the process of determining optimized launch parameters by the satellite constellation deployment optimization system 330. It will be appreciated that in example embodiments, a plurality of areas on the surface of the earth may be used instead of a plurality of points on the surface of the earth to implement the processes enabled by the performance metrics module 518.

In example embodiments, the performance metrics module 518 may have instructions stored thereon that when executed by the processors 500 may configure the processors 500 to solicit the position of particular satellites of the satellite constellation from the processes enabled by the SHARK module 520 at particular times within the service lifetime of the satellite constellation. By doing so, the processes enabled by the performance metrics module 518 may ascertain when a particular satellite "rises" and "sets" at a particular one of the points established on the surface of the earth. The processes enabled by the performance metrics module 518 may be configured to use this type of process, by soliciting positional and/or motion information regarding satellites of the satellite constellation to generate a vector of rise and set times within the mission lifetime of the satellite constellation for each of the satellites at each of the points defined on the surface of the earth. The instructions stored in the performance metrics module 518, as further executed by the processors 500 may further configure the processors 500 to use the set of rise and set times at each of the plurality of points on the earth (or in other embodiments, area segments on the earth) to determine the performance metrics associated with a particular set of initial launch parameters to be evaluated by the processors 500 by executing the instructions stored in the heuristic optimizer module 516.

The SHARK module 520 may have instructions stored thereon that when executed by the processors 500 may configure the satellite constellation deployment optimization system 330 to perform high-fidelity propagation of satellite orbits by accounting for substantially all and/or a selected set of significant orbital perturbations. The SHARK module 520 may enable the processors 500 to be configured to determine the location of any given satellite of a satellite constellation at any time after the deployment of the satellite constellation and before the end of the mission lifetime of the satellite constellation. In yet other words, the instructions stored on the SHARK module 520 may enable processes to receive a temporal coordinate associated with an initial set of launch parameters and provide a set of spatial coordinates corresponding to the received temporal coordinate for one or more of the satellites of the satellite constellation being evaluated. Furthermore, as discussed above, the processes enabled by the SHARK module 520 may be configured to predict a satellite's motion as a function of time in the presence of a user-selectable set of perturbations, including the disturbing acceleration due to the Earth's oblate shape, atmospheric drag, solar radiation pressure, gravitational effects of the Sun and Moon, and nutation/precession of the Earth. The perturbation equations that describe the time rates of change of the orbital position may be derived from Newton's Universal Law of Gravitation by treating each perturbation (e.g., oblate Earth, drag, etc.) as a disturbing acceleration in the equations of motion. The data stored in the SHARK module 520 may integrate these equations to accurately predict a satellite's position and velocity over years, or even decadal time scales.

In example embodiments, to increase the efficiency of providing the motion of the satellites in the satellite constellation over the mission lifetime, such as years or decades, the processes enabled by the instructions stored in the SHARK module 520 may configure the processors 500 to determine the motion of the satellites for any given initial launch parameter set over one or more single orbits, or portions thereof, based on the laws of motion (i.e. Newton's Universal Law of Gravitation, Kepler's Laws of Planetary Motion, etc.) and fit the motion of each of the satellites to one or more polynomials. Therefore, according to example embodiments, the processors 500 may be configured to determine a portion of the motion of a satellite, during a portion of time within the mission lifetime of the satellite by applying Newton's Universal Law of Gravitation and then fitting the results to one or more polynomial functions, such as Chebyshev functions. The SHARK module 520 may further enable the processors 500 to store the fitting coefficients associated with the one or more polynomials associated with a satellite with a particular initial launch parameters in an orbit table, such as in a memory device 510 and/or database, for relatively quick access and use. The SHARK module 520, therefore, in these embodiments, may enable the processors 500, by executing the instructions thereon, to determine the motion of the satellite by utilizing the fitted polynomials, rather than solve the more complex Newton's Universal Law of Gravitation each time a satellite location and/or motion is requested. In other words, the processors 500, to more efficiently (i.e. using fewer computational resources) and/or to more quickly provide location and/or motion information regarding a particular satellite within a suitable level of error, extrapolate and/or interpolate the location of the satellite using the one or more fitted polynomials, such as fitted Chebyshev functions.

The SHARK module 520 may also have instructions stored thereon that when executed by the processors 500 may configure the processors 500 to determine when, where, and on what satellite station keeping ($\Delta v$) may be required. In example embodiments, this may be determined by the processors 500 by receiving and/or identifying a spatial region within which a particular satellite is to remain and determine when and/or where the particular satellite may move outside of the allowable spatial region. In further example embodiments, the processors 500 may be configured to determine if a satellite goes out of allowable bands of its station location. If or when the satellite goes outside of its station bounds, the SHARK system may recognize that station keeping ($\Delta v$) is needed to restore the satellite within the allowable bands of its station (i.e. launch or orbit) parameters. When station keeping is required, the processors 500, by executing instructions stored on the SHARK module 520 may maintain a log of the times and locations of the $\Delta v$ and/or a running total (i.e. sum) $\Delta v$. The precision and number of coefficients for fitting the motion of the satellites, in example embodiments, may be determined by the processors based on a user supplied criteria, such as the number of coefficients and/or a required level of precision and/or accuracy. The coordinates (i.e. spatial and/or temporal) where station keeping is implemented may present additional discontinuities and/or non-linearities in the models, such as in the fitted polynomials, utilized by the processors 500 for rapid determination of satellite locations. In some example case, such as for $\Delta v$, the processors 500, based at least in part on executing instructions stored in the SHARK module 520, may be configured to provide performance parameters, such as $\Delta v$, directly or via the processes enabled by the performance metrics module 518 to the processes enabled by the heuristic optimizer module 516.

The visualization module 522 may have instructions stored thereon that when executed by the processors 500 may configure the satellite constellation deployment optimization system 330 to receive one or more optimized and/or pareto-optimized solutions 340 to the initial launch parameter optimization problem. The processors 500 may be configured to display the optimized launch parameters 340 to the satellite constellation designer. Alternatively, the processors 500 may be configured to display one or more trade-offs, such as pareto-optimized solutions considering two or more optimization objectives.

It will be appreciated that there may be overlap in the functionality of the instructions stored in the operating systems (O/S) module 512, the applications module 514, the heuristic optimizer module 516, the performance metrics module 518, the SHARK module 520, and the visualization module 522. In fact, the functions of the aforementioned modules 512, 514, 516, 518, 520, 522 may interact and cooperate seamlessly under the framework of the satellite constellation deployment optimization system 330. Indeed, each of the functions described for any of the modules 512, 514, 516, 518, 520, 522 may be stored in any module 512, 514, 516, 518, 520, 522 in accordance with certain example embodiments of the disclosure. Further, in certain example embodiments, there may be one single module that includes the instructions, programs, and/or applications described within the operating systems (O/S) module 512, the applications module 514, the heuristic optimizer module 516, the performance metrics module 518, the SHARK module 520, and the visualization module 522.

Figure 6:
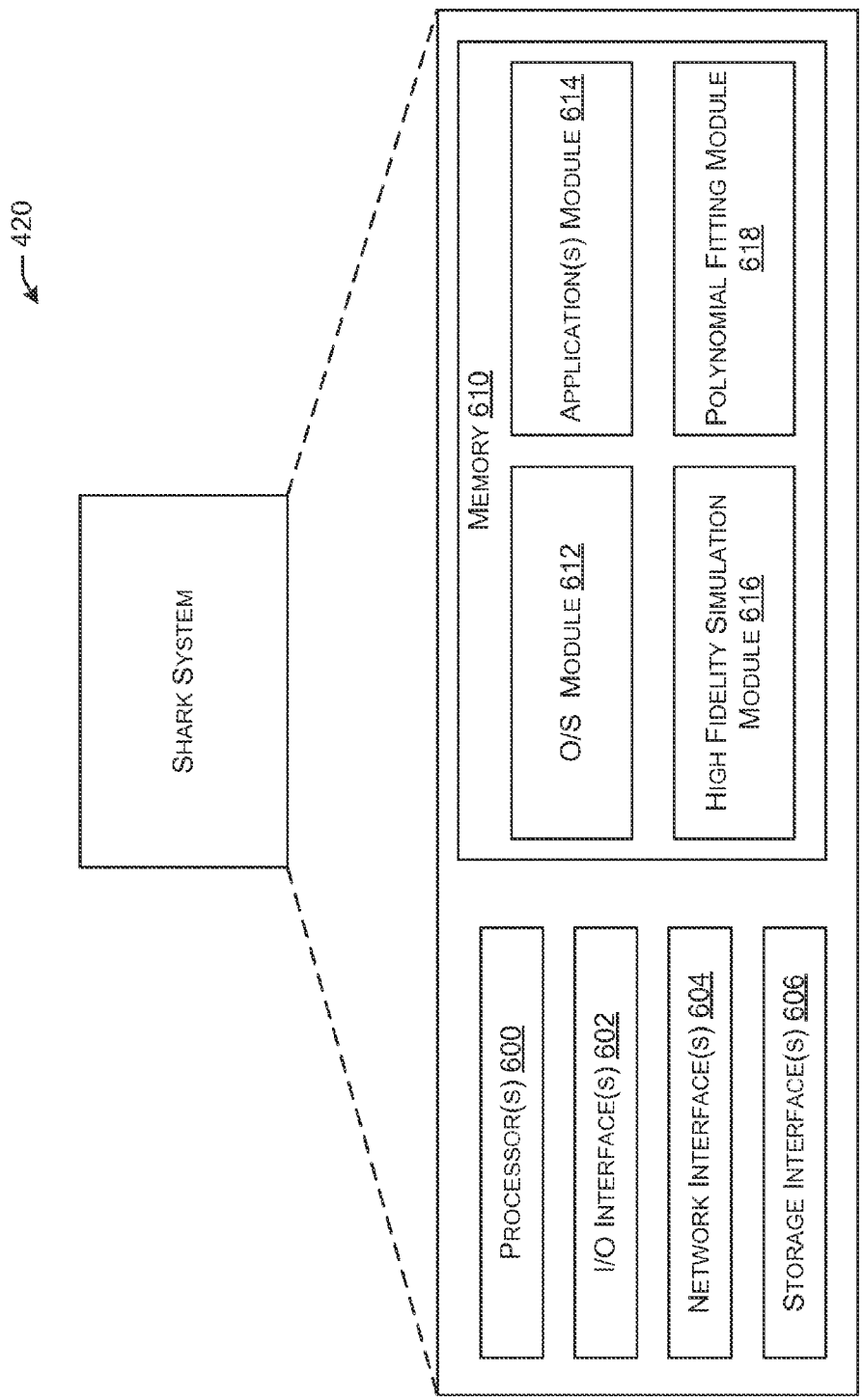
FIG. 6 is a block diagram that illustrates an example implementation of the spacecraft high-fidelity astrodynamics resource kit (SHARK) system, in accordance with embodiments of the disclosure.

FIG. 6 is a block diagram that illustrates an example implementation of the spacecraft high-fidelity astrodynamics resource kit (SHARK) system 420, in accordance with embodiments of the disclosure. The SHARK system 420 may include one or more processors 600, one or more input/output (I/O) interface(s) 602, one or more network interface(s) 604, one or more storage interface(s) 606, and one or more memories 610. The one or more processors 600, the one or more input/output (I/O) interface(s) 602, the one or more network interface(s) 604, the one or more storage interface(s), and the one or more memories 610 descriptions may be substantially similar to the descriptions of the one or more processors 500, the one or more input/output (I/O) interface(s) 502, the one or more network interface(s) 504, one or more storage interface(s) 506, and the one or more memories 510, respectively, and therefore, in the interest of brevity, will not be repeated here.

The memory 610 may store program instructions that are loadable and executable on the processor(s) 600, as well as data generated or received during the execution of these programs. Turning to the contents of the memory 610 in more detail, the memory 610 may include one or more operating systems (O/S) 612, an applications module 614, high-fidelity simulation module 616, and a polynomial fitting module 618. Each of the modules and/or software may provide functionality for the SHARK system 420, when executed by the processors 600. The modules and/or the software may or may not correspond to physical locations and/or addresses in memory 610. In other words, the contents of each of the modules 612, 614, 616, 618 may not be segregated from each other and may, in fact be stored in at least partially interleaved positions on the memory 610. The descriptions of the O/S module 612 and the applications module 614 may be substantially similar to the description of the O/S module 512 and the applications module 514, respectively, and therefore, in the interest of brevity, will not be repeated here.

The high-fidelity simulation module 616 may have instructions stored thereon that when executed by the processors 600 may configure the SHARK system 420 to provide high-fidelity position versus time information associated with one or more of the satellites of the satellite constellation. The processors 600 may be configured to determine the location of any given satellite of a satellite constellation at any time after the deployment of the satellite constellation and before the end of the mission lifetime of the satellite constellation. In yet other words, the instructions stored on high-fidelity simulation module 616 may enable processes to receive a temporal coordinate associated with an initial set of launch parameters and provide a set of spatial coordinates corresponding to the received temporal coordinate for one or more of the satellites of the satellite constellation being evaluated. Furthermore, the processes enabled by the high-fidelity simulation module 616 may be configured to predict a satellite's motion as a function of time in the presence of a user-selectable set of perturbations, including the disturbing acceleration due to the Earth's oblate shape, atmospheric drag, solar radiation pressure, gravitational effects of the Sun and Moon, and nutation/precession of the Earth. The perturbation equations that describe the time rates of change of the orbital position may be derived from Newton's Universal Law of Gravitation by treating each perturbation (e.g., oblate Earth, drag, etc.) as a disturbing acceleration in the equations of motion. The data stored in the high-fidelity simulation module 616 may integrate these equations to accurately predict a satellite's position and velocity over years, or even decadal time scales.

The high-fidelity simulation module 616 may also have instructions stored thereon that when executed by the processors 600 may configure the processors 600 to determine when, where, and on what satellite station keeping ($\Delta v$) may be required. In example embodiments, this may be determined by the processors 600 by receiving and/or identifying a spatial region within which a particular satellite is to remain and determine when and/or where the particular satellite may move outside of the allowable spatial region. In further example embodiments, the processors 600 may be configured to determine if a satellite goes out of allowable bands of its station location. If or when the satellite goes outside of its station bounds, the SHARK system may recognize that station keeping ($\Delta v$) is needed to restore the satellite within the allowable bands of its station (i.e. launch or orbit) parameters. When station keeping is required, the processors 600, by executing instructions stored on the high-fidelity simulation module 616 may maintain a log of the times and locations of the $\Delta v$ and/or a running total (i.e. sum) $\Delta v$. The precision and number of coefficients for fitting the motion of the satellites, in example embodiments, may be determined by the processors based on a user supplied criteria, such as the number of coefficients and/or a required level of precision and/or accuracy. The coordinates (i.e. spatial and/or temporal) where station keeping is implemented may present additional discontinuities and/or non-linearities in the models, such as in the fitted polynomials, utilized by the processors 600 for rapid determination of satellite locations. In some example case, such as for $\Delta v$, the processors 600, based at least in part on executing instructions stored in the high-fidelity simulation module 616, may be configured to provide performance parameters, such as $\Delta v$, directly or via the processes enabled by the performance metrics system 410 to the processes enabled by the heuristic optimizer system 400.

The polynomial fitting module 618 may have instructions stored thereon that when executed by the processors 600 may configure the SHARK system 420 to increase the efficiency of providing the motion of the satellites in the satellite constellation over the mission lifetime, such as years or decades. The processes enabled by the instructions stored in the polynomial fitting module 618 may configure the processors 600 to determine the motion of the satellites for any given initial launch parameter set over one or more single orbits, or portions thereof, based on the laws of motion (i.e. Newton's Universal Law of Gravitation, Kepler's Laws of Planetary Motion, etc.) and fit the motion of each of the satellites to one or more polynomials. Therefore, according to example embodiments, the processors 600 may be configured to determine a portion of the motion of a satellite, during a portion of time within the mission lifetime of the satellite by applying Newton's Universal Law of Gravitation and then fitting the results to one or more polynomial functions, such as Chebyshev functions. The polynomial fitting module 618 may further enable the processors 600 to store the fitting coefficients associated with the one or more polynomials associated with a satellite with a particular initial launch parameters in an orbit table, such as in a memory device 610 and/or database, for relatively quick access and use. The polynomial fitting module 618, therefore, in these embodiments, may enable the processors 600, by executing the instructions thereon, to determine the motion of the satellite by utilizing the fitted polynomials, rather than solve the more complex Newton's Universal Law of Gravitation each time a satellite location and/or motion is requested. In other words, the processors 600, to more efficiently (i.e. using fewer computational resources) and/or to more quickly provide location and/or motion information regarding a particular satellite within a suitable level of error, extrapolate and/or interpolate the location of the satellite using the one or more fitted polynomials, such as fitted Chebyshev functions.

It will be appreciated that the SHARK system 420, in example embodiments, may be a high fidelity astrodynamics propagator. In example embodiments, the SHARK system 420 may utilize numerical integration to determine the location of one or more satellites of the satellite constellation to be optimized. This astrodynamic propagation (e.g., determination of the location of the satellites of the satellite constellation) may be over the full mission lifetime of the satellite constellation. In example embodiments, the SHARK system 420 may be configured to partition the mission lifetime into time segments over which the calculations are to be carried out to determine the locations of each of the satellites of the satellite constellation.

It will be appreciated that there may be overlap in the functionality of the instructions stored in the operating systems (O/S) module 612, the applications module 614, the high-fidelity simulation module 616, and the polynomial fitting module 618. In fact, the functions of the aforementioned modules 612, 614, 616, 618 may interact and cooperate seamlessly under the framework of the SHARK system 420. Indeed, each of the functions described for any of the modules 612, 614, 616, 618 may be stored in any module 612, 614, 616, 618 in accordance with certain example embodiments of the disclosure. Further, in certain example embodiments, there may be one single module that includes the instructions, programs, and/or applications described within the operating systems (O/S) module 612, the applications module 614, the high-fidelity simulation module 616, and the polynomial fitting module 618.

Figure 7:
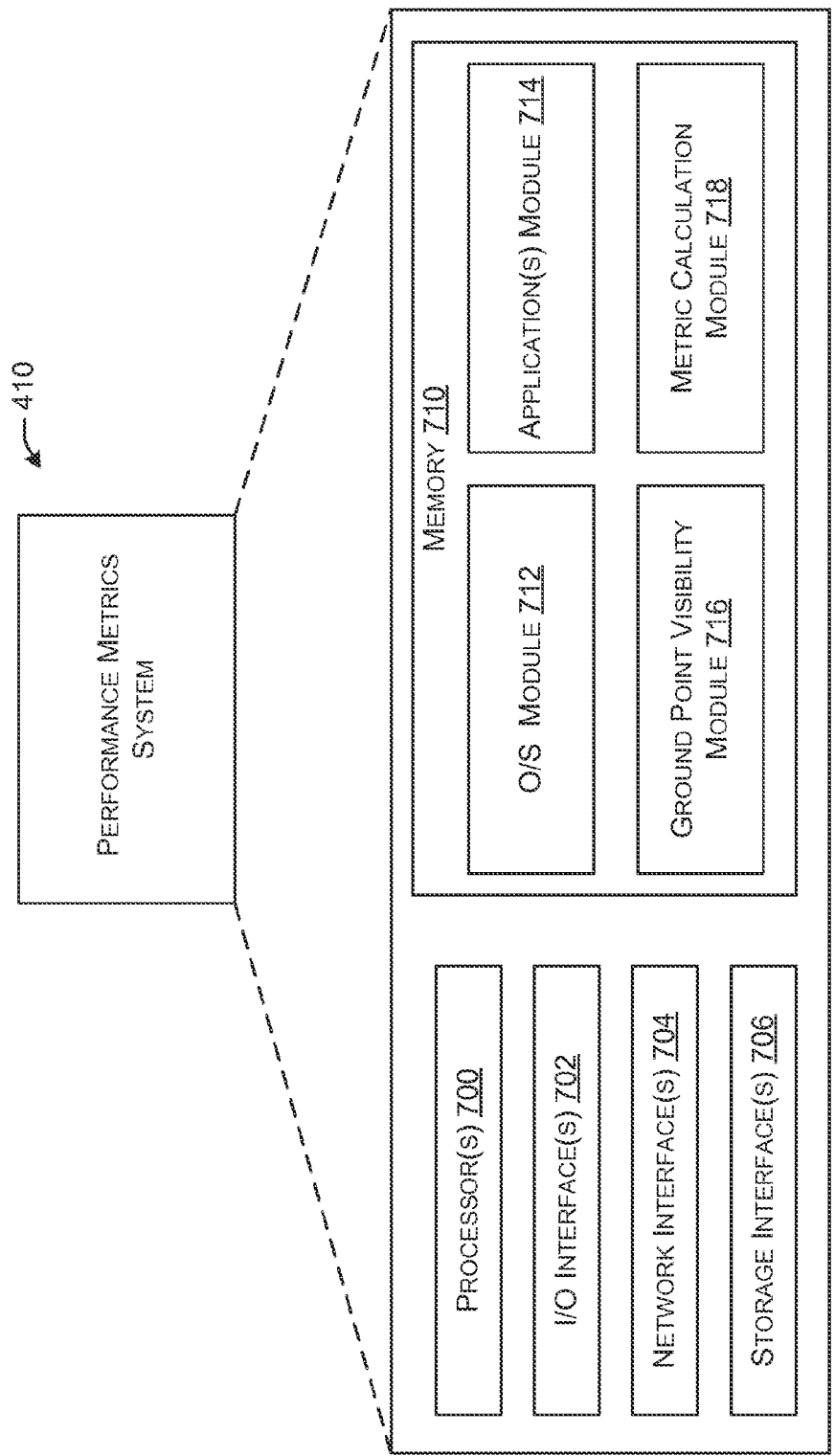
FIG. 7 is a block diagram that illustrates an example implementation of a performance metrics system, in accordance with embodiments of the disclosure.

FIG. 7 is a block diagram that illustrates an example implementation of a performance metrics system, in accordance with embodiments of the disclosure. The performance metrics system 410 may include one or more processors 700, one or more input/output (I/O) interface(s) 702, one or more network interface(s) 704, one or more storage interface(s) 706, and one or more memories 710. The one or more processors 700, the one or more input/output (I/O) interface(s) 702, the one or more network interface(s) 704, the one or more storage interface(s), and the one or more memories 710 descriptions may be substantially similar to the descriptions of the one or more processors 500, the one or more input/output (I/O) interface(s) 502, the one or more network interface(s) 504, one or more storage interface(s) 506, and the one or more memories 510, respectively, and therefore, in the interest of brevity, will not be repeated here.

The memory 710 may store program instructions that are loadable and executable on the processor(s) 700, as well as data generated or received during the execution of these programs. Turning to the contents of the memory 710 in more detail, the memory 710 may include one or more operating systems (O/S) 712, an applications module 714, a ground point visibility module 716, and a metric calculation module 718. Each of the modules and/or software may provide functionality for the performance metrics system 410, when executed by the processors 700. The modules and/or the software may or may not correspond to physical locations and/or addresses in memory 710. In other words, the contents of each of the modules 712, 714, 716, 718, 720, 722 may not be segregated from each other and may, in fact be stored in at least partially interleaved positions on the memory 710. The descriptions of the O/S module 712 and the applications module 714 may be substantially similar to the description of the O/S module 512 and the applications module 514, respectively, and therefore, in the interest of brevity, will not be repeated here.

The ground point visibility module 716 may have instructions stored thereon that when executed by the processors 700 may configure the performance metrics system 410 to perform a variety of functions for determining rise and set times of satellites to a plurality of ground points within the mission lifetime of the satellite constellation being designed and/or optimized. In example embodiments of the disclosure, the processors 700, by executing the instructions stored in the ground point visibility module 716 may be configured to consider a plurality of points on the surface of the earth, such as, for example 408 different points on the surface of the earth. At this plurality of points, the processes enabled by the instructions stored in the ground point visibility module 716 may cooperate with the processes enabled by the SHARK system 420 to determine the rise and set time, such as with a specified minimum elevation angle, of each satellite of the satellite constellation. In example embodiments, the processes of the ground point visibility module 716 may be configured to establish the points on the surface of the earth based at least in part on user input, such as user input that may be received via processes enabled by the heuristic optimizer system 400 and/or the visualization system 430. In other words, an operator of the satellite constellation deployment optimization system 330 may provide the points for evaluation of performance metrics to the processes enabled by the ground point visibility module 716 and implemented by the processors 700, such as via one or more user interfaces of the satellite constellation deployment optimization system 330. In some cases, the points of evaluation on the surface of the earth may be evenly (i.e. may be substantially equally separated from each other spatially). In other cases, the plurality of points considered for determining performance metrics may not be evenly spaced (i.e. some of the plurality of points may be more closely spaced than others of the plurality of points).

In example embodiments, the ground point visibility module 716 may have instructions stored thereon that when executed by the processors 700 may configure the processors 700 to solicit the position of particular satellites of the satellite constellation from the processes enabled by the SHARK system 420 at particular times within the service lifetime of the satellite constellation. By doing so, the processes enabled by the ground point visibility module 716 may ascertain when a particular satellite "rises" and "sets" at a particular one of the points established on the surface of the earth. The processes enabled by the ground point visibility module 716 may be configured to use this type of process, by soliciting positional and/or motion information regarding satellites of the satellite constellation to generate a vector of rise and set times within the mission lifetime of the satellite constellation for each of the satellites at each of the points defined on the surface of the earth.

The metric calculation module 718 may have instructions stored thereon that when executed by the processors 700 may configure the performance metrics system 410 to use the set of rise and set times at each of the plurality of points on the earth (or in other embodiments, area segments on the earth) to determine performance metrics associated with a particular set of initial launch parameters to be evaluated by the processors 700. In example embodiments, the processes enabled by the instructions stored in the metric calculation module 718 may be called upon by the processes in the heuristic optimizer system 400 to provide a specified set of performance metrics for a set of initial launch parameters under evaluation by the heuristic optimizer system 400.

In example embodiments, the processors 700 may be configured to determine individual performance, such as coverage performance, revisit times, or the like, at each of the plurality of points for a particular set of initial launch parameters, such as initial launch parameters provided by the heuristic optimizer system 400 to be evaluated, by interacting with the processes enabled by the instructions stored in the SHARK system 420. The processes enabled by the metric calculation module 718 may further be configured to aggregate the performance determined for the plurality of points, such as by determining averages, minima, maxima, or the like. These aggregated performance metrics may be provided by the processes enabled by the metric calculation module 718, responsive to a request for performance metrics from the heuristic optimizer system 400 at a particular set of initial launch parameters to be evaluated in the process of determining optimized launch parameters by the satellite constellation deployment optimization system 330. It will be appreciated that in example embodiments, a plurality of areas on the surface of the earth may be used instead of a plurality of points on the surface of the earth to implement the processes enabled by the metric calculation module 718.

It will be appreciated that there may be overlap in the functionality of the instructions stored in the operating systems (O/S) module 712, the applications module 714, the ground point visibility module 716, and the metric calculation module 718. In fact, the functions of the aforementioned modules 712, 714, 716, 718 may interact and cooperate seamlessly under the framework of the performance metrics system 410. Indeed, each of the functions described for any of the modules 712, 714, 716, 718 may be stored in any module 712, 714, 716, 718 in accordance with certain example embodiments of the disclosure. Further, in certain example embodiments, there may be one single module that includes the instructions, programs, and/or applications described within the operating systems (O/S) module 712, the applications module 714, the ground point visibility module 716, and the metric calculation module 718.

Figure 8:
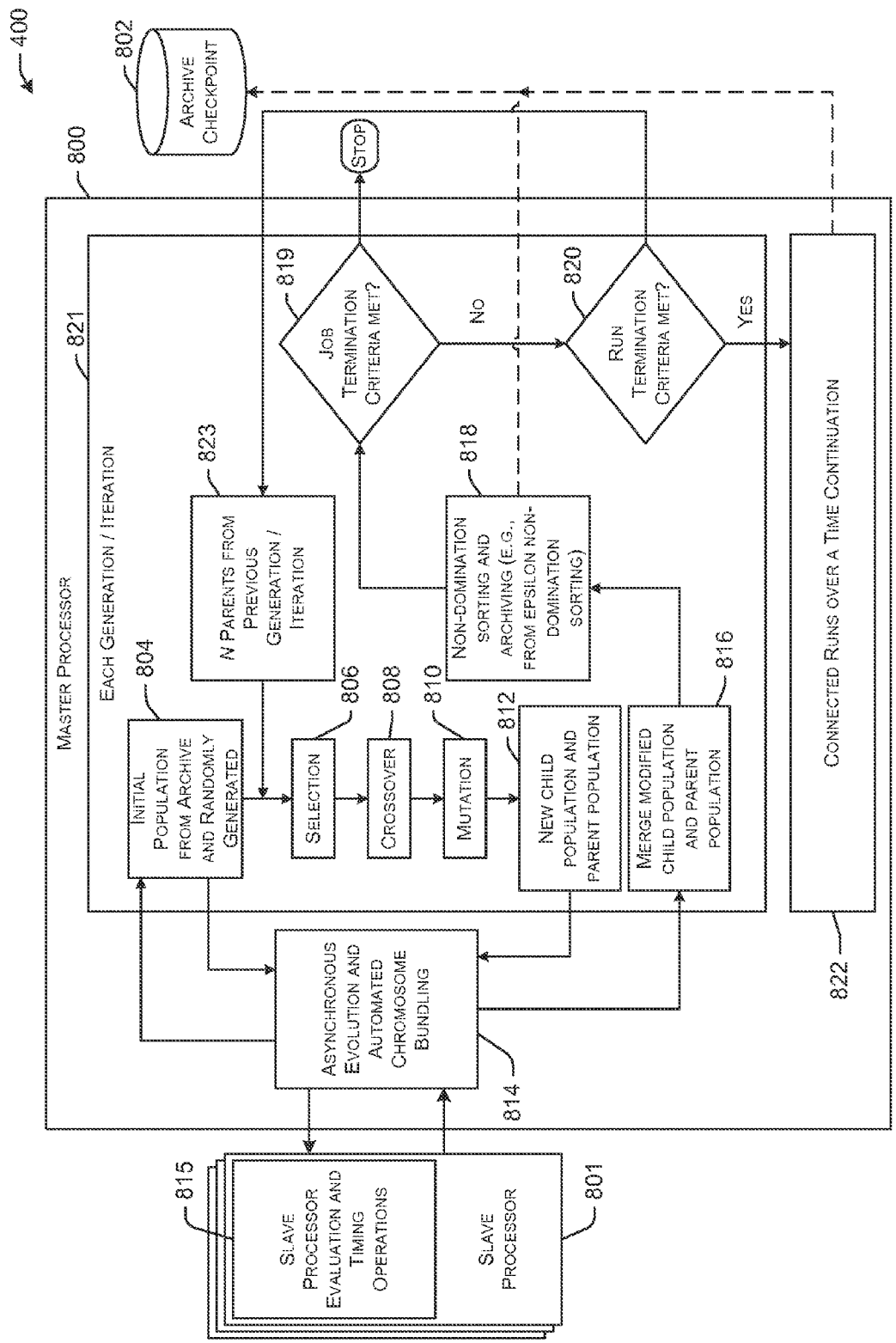
FIG. 8 is a block diagram that illustrates an example implementation of a heuristic optimizer system, in accordance with embodiments of the disclosure.

FIG. 8 is a block diagram that illustrates an example implementation of the heuristic optimizer system 400, in accordance with embodiments of the disclosure. In this example embodiment, the heuristic optimizer system may be implemented as an example parallel processing system 400 that executes an evolutionary algorithm, according to an example embodiment of the disclosure. As shown in FIG. 8, a first portion of the evolutionary algorithm may be performed by a master processor 800 while a second portion of the evolutionary algorithm may be performed by one or more slave processors 801, as discussed herein. In some example embodiments, the performance metric system 410 and the SHARK system 420, as described above, may be implemented on the slave processors 801. In other example embodiments, the processes of the performance metrics module 518 and the SHARK module 520 may be implemented on the slave processors 801.

In an example embodiment of the disclosure, an executed job of the evolutionary algorithm may comprise a plurality of connected runs 822 that occur in a sequence to form a time continuation. Each run 822 may comprise one or more evolutionary operations performed during one or more generations/iterations 821. It will be appreciated that a run may be connected to a prior run in that at least some of the same parents are shared in the "initial population" of launch parameters utilized for initiating respective runs, according to an example embodiment of the disclosure.

Example processing by an executed job of the evolutionary algorithm will now be discussed in further detail. Referring now to block 804, the master processor 800 may receive or obtain an initial population of parent chromosome data structure (i.e. launch parameter set organized as a data structure), representing initial launch parameters identified as a starting point to be evaluated. In an example embodiment of the disclosure, each parent chromosome data structure (i.e. initial launch parameter) may include the chromosome, where the chromosome may include one or more parameters (which may also be referred to as "genes"), which may include:

Static (Fixed Value/Constant) Variables: Once assigned, the values of the static variables remain constant and are not changed by any evolutionary operations of an evolutionary algorithm;

Evolved Variables: The values of the evolved variables may be changed by one or more evolutionary operations of an evolutionary algorithm; and Derived Variables: The values of the derived variables are derived based upon a combination of one or more static variables, evolved variables, and other derived variables in accordance with one or more functions.

Math Variable: A variable may be derived based upon an equation using operands comprising either constants or variables that specify values from other elements specified. The variable names may follow the name convention <alphabetic character><number>, where the <alphabetic character> may specify the column position of elements within an array and/or spreadsheet, and the <number> may specify the row position within the array and/or spreadsheet. It will be appreciated that a math variable may be a fixed or constant value (double precision or integer precision).

Function Variable: A variable may be produced by a function call, which may include calling arguments of a plurality of other constants, and variables.

Any one of the static variables, evolved variables, the derived variables, the math variables, and/or the function variables may be of a variety of types including, but not limited, to integer, double precision, characters, Boolean (two possible values, e.g. 'ON' or 'OFF'; '0' or '1'; 'TRUE' or 'FALSE'), pair of double precision numbers pair of integers array of double precision numbers, array of integers file/spreadsheet, and/or Gaussian.

Still referring to block 804, the initial population of parent chromosome data structures may be obtained by one or more sources. In an example embodiment of the disclosure, the initial population of parent chromosome data structures may be obtained from a combination of the archive checkpoint 802 and random generation of new chromosome data structures. The archive checkpoint 802 may include a known solution, such as an experiential solution. As a non-limiting example, 25% of the initial population of parent chromosome data structures may be obtained from the archive checkpoint 802 while 75% of the initial population may be randomly generated. The chromosomes obtained from the archive checkpoint 802 may have previously been evaluated in accordance with the objective functions. On the other hand, the randomly generated chromosomes may not have been evaluated in accordance with the objective functions, and thus, they may be delivered to block 814, which allocates the chromosomes to the slave processors 801 for objective function evaluation by block 815. In certain embodiments, the initial population of parent chromosomes may include one or more known solutions, or a baseline solution, provided to the heuristic optimizer system in the form of an evolutionary algorithm system 400.

The archive checkpoint 802 may include an elite set of chromosome data structures (i.e., elite solutions of launch parameter sets of the satellite constellation under design) obtained from one or more prior generations/iterations 821, according to an example embodiment of the disclosure. Initially, the archive checkpoint 802, in certain embodiments, may be populated with one or more known solution chromosomes, such as a baseline chromosome solution. Alternatively, if no baseline solution is known, the archive checkpoint may initially be populated with a derived known solution using a variety of suitable mechanisms, such as vastly infeasible search space mechanism. The archive checkpoint 802 may take the form of a data file or database stored in a computer memory, computer disk, network storage, or other non-volatile memory. In accordance with embodiments of the disclosure, the archive checkpoint 802 may contain one or more elite set of chromosomes, such as known solutions.

Archived chromosome data structures that were previously evaluated in a prior generation/iteration 821 may be associated with a plurality of objective function values corresponding to a respective plurality of objective functions. Each objective function may be associated with any predefined objective to be optimized by the executed job of the evolutionary algorithm. For example, in a satellite constellation coverage optimization, an objective function may be associated with the objective of maximizing global coverage, and a corresponding objective function value may indicate which chromosome data structure (based upon the included chromosome and its respective genes) is able to achieve the greatest amount of global coverage. It will be appreciated that in many cases, there may be multiple objectives. It will further be appreciated that in some cases, one or more of the objectives may not be independent of each other. Indeed, the objective functions may have non-zero correlation to each other. It will yet further be appreciated that the objective functions may be of any suitable variable type, such as integer, double precision, characters, Boolean, or the like.

Alternatively, in block 804, the initial population of parent chromosome data structures may be produced from only randomly generated chromosomes. In generating the random chromosome data structures, the values for the evolved and/or static variables (e.g., fixed values/constants) in the one or more chromosomes may be selected to be within specified allowable ranges or limits. Values for the derived variables can be calculated from one or more evolved variables, static variables, and/or other derived variables in accordance with one or more specified functions. The randomly generated parent chromosome data structures may then be delivered to block 814, which allocates the chromosomes to the slave processors 801 for objective function evaluation by block 815. Once the objective function evaluations evaluation in block 815 have been completed, and the objective function values have been received in block 814, then each of the randomly generated parent chromosome data structures may be associated with a respective plurality of objective function values.

Having received or obtained the initial population of parent chromosome data structures in block 804, processing may then proceed to block 806. In block 806, the master processor 800 may select pairs of parent chromosome data structures from the input population of parent chromosome data structures of launch parameters. In an example embodiment of the disclosure, the selection of the pairs of parent chromosome launch parameter data structures may occur according to a tournament selection process, which may include a crowded tournament selection process. An example tournament selection process in accordance with an example embodiment of the disclosure may occur by first selecting two pairs with equal probability based upon a uniform distribution of the input population. Then each pair of chromosome data structures competes in a tournament where the individual with the best fitness is retained. It will be appreciated that best fitness may be determined according to domination rank (as described herein) and where the domination rank is the same, the greatest crowding distance (e.g., nearest neighbor with respect to the entire population in accordance with a measure of diversity) wins the tournament. Other measures of diversity may be used without departing from example embodiments of the disclosure. The winners of each tournament become the two parents resulting from the selection process of block 806. It will be appreciated that a predetermined number of pairs of parent chromosome data structures may be selected in block 806. It will also be appreciated that a particular parent chromosome data structure may be present in two or more selected pairs of parent chromosome data structures, according to an example embodiment of the disclosure. In some cases, the number of parent chromosomes selected in each round or iteration may be dynamic.

Following block 806, the chromosomes in selected pairs of parent chromosome data structures may be subject to one or more evolutionary operators to generate a plurality of child chromosome data structures, according to an example embodiment of the disclosure. Two example evolutionary operators are illustrated by blocks 808 and 810. For example, block 808 illustrates a crossover evolutionary operator in which a portion of the parameter values or "gene" values (i.e. individual launch parameters of a satellite of the satellite constellation under design) may be exchanged between chromosomes in selected pairs of parent chromosome data structures to generate new pairs of chromosome data structures. In an example embodiment of the disclosure, the crossover evolutionary operation may be capable of performing crossover using integer or non-integer numbers (e.g., double precision numbers, etc.), binary representation of numbers, letters, and/or symbols. As another example, block 810 illustrates a mutation evolutionary operator in which a parameter value or gene value (e.g., an evolved variable value) in a chromosome of a chromosome data structure may be varied or otherwise changed to another value by a mutation.

It will be appreciated that the crossover evolutionary operator and the mutation evolutionary operator need not necessarily be applied to genes of each received chromosome in the chromosome data structure. In an example embodiment of the disclosure, only a portion or percentage of the received chromosomes in the chromosome data structures in blocks 808 and 810 may have their genes crossed-over or mutated, respectively. The respective portions or percentages that are crossed-over and/or mutated may be predetermined or dynamically varied during operation of the evolutionary algorithm, according to an example embodiment of the disclosure. For example, a first predetermined portion or percentage (e.g., 50%-80%) of the received chromosomes of the chromosome data structures may have genes that are crossed over in block 808 while a second predetermined portion or percentage (e.g., 1%-3%) of the received chromosomes of the chromosome data structures may have genes that are mutated in block 810. On the other hand, for dynamic variations, the respective portions or percentages that are crossed-over and/or mutated may be increased or decreased during runtime to increase or decrease the rate of evolutionary progress as desired or required. It will be appreciated that other evolutionary operators besides blocks 808 and 810 may be available without departing from example embodiments of the disclosure. Likewise blocks 808 and 810 may be performed in a different order than that shown in FIG. 8 or otherwise combined into a single block without departing from example embodiments of the disclosure.

After the evolutionary operations of block 806, 808, and 810, a new population of child chromosome data structures (i.e. launch parameters to be evaluated) may be obtained in block 812. Following block 812, processing may proceed to block 814. In block 814, the new population of child chromosome data structures may be received into a "To Evaluate" list or queue (see also FIG. 9, which illustrates block 814 in further detail). Block 814 may then allocate the chromosome data structures from the "To Evaluate" list or queue to the plurality of slave processors 801 according to an asynchronous evolution process. An automated chromosome bundling process, discussed in further detail with respect to FIG. 9, may also be utilized in block 814 to determine how many chromosome data structures should be included in a respective chromosome bundle for a respective slave processor 801. For example, a slave processor 801 with faster processing capability may receive a chromosome bundle with a larger number of chromosome data structures. Alternatively, the slave processor 801 may receive a fixed number of launch parameters sets in the form of chromosome data structures in a chromosome bundle, but simply receive a larger number of chromosome bundles within a predetermined amount of time. The example automated chromosome bundling process may allow efficient allocation of chromosome data structures among the plurality of slave processors 801. In some cases, the number of flags, indicating the number of genes that are permitted to be considered as deviating from the baseline solution chromosome, may be considered in the bundling process.

In block 815, each slave processor 801 may have received a chromosome bundle comprising one or more chromosome data structures from the master processor 800. Additionally, in certain embodiments, the slave processors 801 may further receive a baseline chromosome, representing a known solution. The slave processors 801 may be homogenous or heterogeneous in processing capability. Each slave processor 801 may evaluate, in accordance with a plurality of objective functions, the received chromosome bundle of chromosome data structures, and/or the baseline solution chromosome to generate a plurality of respective objective function values for each chromosome data structure in block 815. In some example embodiments, the slave processors 801 may perform the functions of the performance metric system 410 and/or the SHARK system 420 to generate performance metrics and/or objective functions based on the generated performance metrics associated with the chromosomes (i.e. launch parameter sets) to be evaluated. In addition, each slave processor 801 may also perform timing operations or calculations, including determination of certain wait times and/or evaluation times associated with the respective slave processor 801, in block 815. As each slave processor 801 finishes the objective function evaluations and/or timing operations in block 815, the slave processor 801 may provide a results bundle (e.g., objective function values) and timing data (e.g., wait times and/or objective function evaluation times) to the master processor 800. The master processor 800 may provide the received objective function values as well as an identification of the corresponding evaluated child chromosome data structures to a "Finished" list or queue. It will be appreciated that with asynchronous evolution processing, the objective function results may be included in the "Finished" list or queue on an as-received basis from the slave processor 801. Indeed, the evolutionary process may be asynchronous in that as soon as the "To Evaluate" list is empty for a given generation/iteration 821, the processing taking place in block 814 is completed, where the child population passed to block 816 is comprised of all of the chromosome data structures currently within the "Finished" list. It will be further appreciated that the results from some of the chromosome bundles previously sent to the various slave processors 801 may not have been received at the time the "To Evaluate" list is emptied. These may be referred to as late chromosome data structures from one or more prior generations/iterations.

In block 816, the master processor 800 may receive a modified child population of chromosome data structures from the asynchronous evolution process of block 814. In certain embodiments, the modified child population may include different chromosome structures as well as a different number of chromosome data structures as compared to the child population of block 812. The received modified child population is merged with the current parent population, as illustrated by block 816. In block 818, the master processor 800 may perform non-domination sorting (e.g., based off of an epsilon vector) of the merged list of child and parent chromosome data structures of launch parameter sets under evaluation to identify an elite set of chromosome data structures based at least in part on the corresponding objective function values. According to an example embodiment, non-domination sorting may utilize the concept of domination to compare solutions provided by the merged list of child and parent chromosome data structures. A solution $x_1$ is said to dominate solution $x_2$ if both conditions 1 and 2 identified below are true:

Condition 1: The solution $x_1$ is no worse than $x_2$ in all objectives.

Condition 2: The solution $x_1$ is strictly better than $x_2$ in at least one objective.

If both conditions 1 and 2 are satisfied, then all of the following statements are substantially equivalent:

$x_2$ is dominated by $x_1$, $x_1$ is non-dominated by $x_2$, or $x_1$ is non-inferior to $x_2$.

Accordingly, non-domination sorting in block 818 may be performed to determine a set of chromosome data structures (e.g., designs) that are non-dominated with respect to other solutions when comparing the respective objective function values corresponding to the objective functions. For example, non-domination sorting may involve classifying the merged list of child and parent chromosome data structures into multiple fronts (for two objective functions), surfaces (for three objective functions), volume (for 4 objective functions), or hypervolumes (for 5+ objective functions) based off of their respective domination rank. In an example embodiment of the disclosure, domination ranking may proceed by first considering the entire merged list of child and parent chromosome data structures. The objective function values corresponding to the objective functions for each chromosome data structure are compared and the non-dominated solutions from the list are identified. These solutions are assigned a domination rank of 1 and removed from the merged list. The reduced merged list of child and parent chromosome data structures are then considered and the next set of non-dominated solutions are identified and assigned a rank of 2. This process is iterated until all members of the merged list are assigned a domination rank. In addition, an evolutionary operator providing crowded tournament selection may be applied to increase the diversity of choice among the solutions making up the fronts, surfaces, volumes, or hypervolumes. As an example, during crowded tournament selection, a solution may win a tournament if it has the highest non-domination rank, or if the ranks are equal, the solution with the better crowding distance may prevail. Crowding distance may be defined as the largest distance or cuboid surrounding a solution in which no other solutions are present. The obtained elite set of chromosome data structures for the particular generation/iteration may be stored in the archive checkpoint 802 or another archive of a computer memory or other data storage for subsequent retrieval.

Following processing in block 818, processing may proceed to block 819. In block 819, a determination is made as to whether the current job is completed such that the evolutionary algorithm should be terminated. A job typically comprises processing involving a plurality of connected runs 822, where each run 822 may include processing associated with one or more generations/iterations 821. Block 819 may include, but is not limited to, termination based upon whether the search has failed to produce sufficient improvement in solutions over a predefined number of generations/iterations or whether a maximum number of function evaluations have been completed or a maximum time (e.g., based upon a wall clock time) has elapsed. For example, the evolutionary algorithm may terminate, according to sufficient improvement termination criterion, if a predetermined percentage (e.g., 90%) of the obtained solutions remain in the same epsilon rectangles, volumes, or hypervolumes/hyperrectangles for a prior number of generations (e.g., the last 20 generations), or alternatively, across a prior number of connected runs, in accordance with an example box fitness termination criteria. In an example embodiment of the disclosure, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations. It will be appreciated that the obtained solutions comprising the chromosome data structures may be output in a variety of formats, including a database format, a comma separated value (CSV) format, or a graphical format.

If block 819 determines that the job is not complete, then processing may proceed to block 820 to determine whether the current run 822 has completed. In determining whether the current run is complete, block 820 may determine whether a current run 822 has failed to produce improvement in quantity and quality of the solutions generated from the prior iterations/generations 821. The quantity measure may be based upon the number of solutions. The quality measure may be based on some quantification of distance from a utopia point, box fitness, or yet another measure.

If block 820 determines that a current run 822 is not complete, then processing may proceed to block 823, wherein a population of parent chromosome structures may be obtained or otherwise selected from the elite chromosome data structures determined from block 818. The prior process is then repeated for another generation/iteration 821 using the parent chromosome data structures from the prior generation/iteration. It will be appreciated that because the evolution process of block 814 is asynchronous, there may be one or more late child chromosome data structures received in the "Finished" list or queue in 816 that are associated with one or more pairs of parent chromosome data structures allocated to slave processors 801 during one or more prior generations/iterations. Therefore, in the next generation/iteration 821, the merged children chromosome data structures in block 816 may likewise include those late child chromosome data structures as well as current child chromosome data structures from parent chromosome data structures allocated to slave processors 801 during the current generation/iteration 821.

On the other hand, block 820 may determine that a current run 822 is complete. For example, looking back over a predetermined number of generations, the search may have failed to produce improvement in the solutions during each generation/iteration 821 of the current run 822. Improvement may be based upon the quantity of the solutions (e.g., the number of solutions) and the quality of the solutions (e.g., some quantification of distance from a utopia point, box fitness, etc.). In this case, the current run 822 is completed, and processing proceeds to initiate a subsequent run 822. The subsequent run 822 may generate an initial population by invigorating the elite solutions stored in the archive checkpoint 802. In particular, the subsequent run 822 may utilize a first number of the elite solutions from the archive checkpoint 802 as part of the initial population utilized in block 804, but may also invigorate the initial population by adding a second number of randomly generated parent chromosome data structures. The randomly generated parent chromosome data structures may be generated and evaluated using the example processes discussed with respect to blocks 804 and 814.

Figure 9:
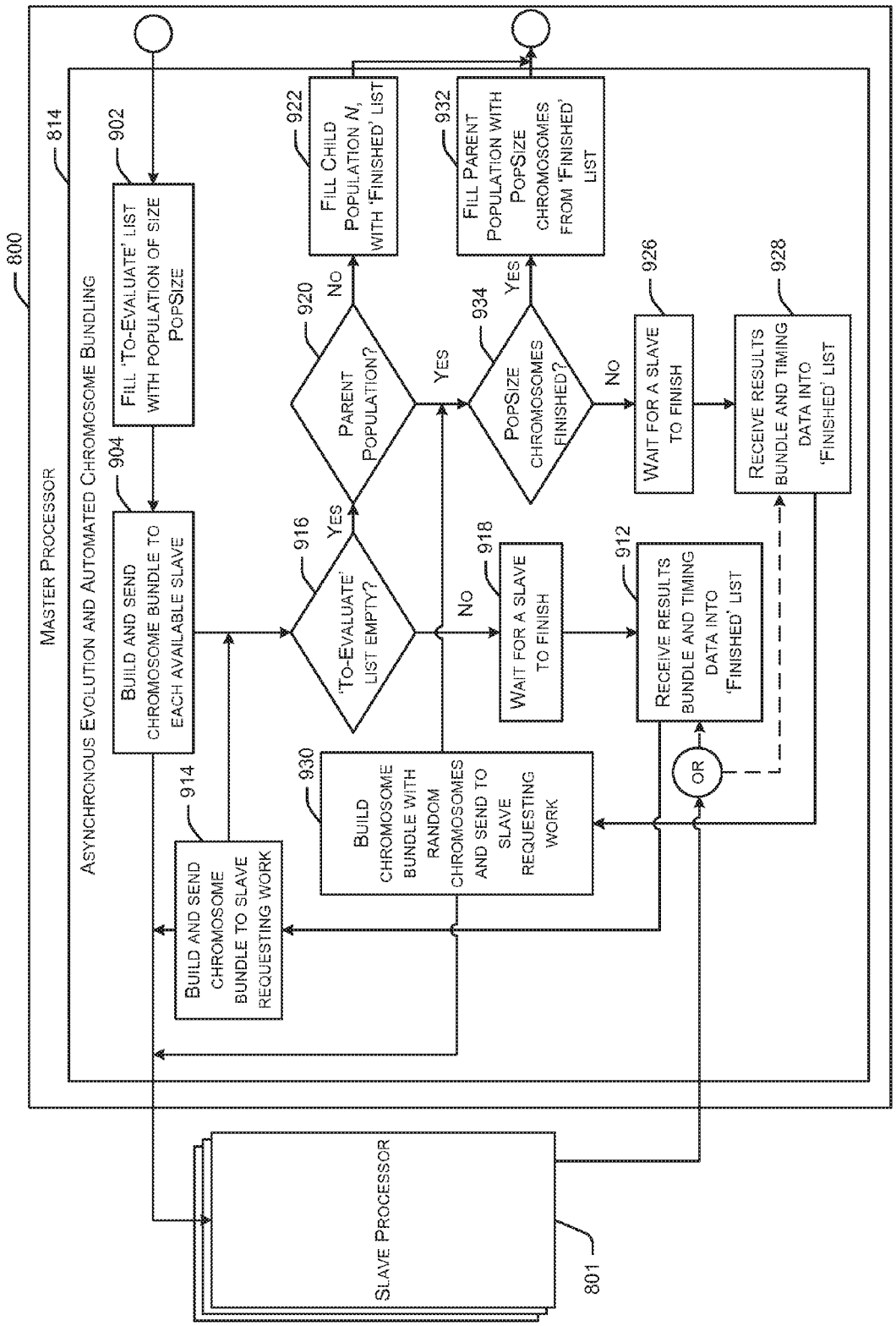
FIG. 9 is a block diagram that illustrates an example implementation of an asynchronous evolution and automated bundling engine within the heuristic optimizer system of FIG. 8, in accordance with embodiments of the disclosure.

FIG. 9 illustrates an example implementation of an asynchronous evolution and automated chromosome bundling process that may be utilized for block 214 of FIG. 8. It will be appreciated that the example asynchronous evolution and automated chromosome bundling process of FIG. 9 is provided by way of example only, and that many variations are available without departing from example embodiments of the disclosure.

The asynchronous evolution and automated chromosome bundling process can be utilized in conjunction with at least two example scenarios: (i) evaluation of a randomly generated initial population (e.g., block 804 of FIG. 8) or (ii) evaluation of a new child population (e.g., block 812 of FIG. 8).

Turning now to FIG. 9, the process begins with block 902 in which a "To Evaluate" list or queue is filled with either (i) the randomly generated input population of parent chromosome data structures from block 804, or (ii) the new child population of chromosome data structures from block 812. In block 904, the master processor 800 may allocate the chromosome data structures from the "To-Evaluate" list or queue to some or all of the plurality of slave processors 801. More specifically, in block 904, the master processor 800 may build a chromosome bundle for each available slave processor 801 that is to receive work. It will be appreciated that some slave processors 801 may be busy processing chromosome bundles from previous generations/iterations. The number of chromosome data structures included within each chromosome bundle may be determined by the master processor 800 using an example bundling calibration algorithm, which will now be described in further detail.

In an example embodiment of the disclosure, an example chromosome bundling calibration algorithm may utilize the following tuning knobs or tuning parameters, which may be set, predetermined, or adjusted by a user:

Time_to_Process_Chrom_Bundle_Theshold: A threshold time to process the chromosome bundle (e.g., 10 minutes). This threshold time may provide a target for how many chromosome data structures to include in a chromosome bundle such that the processing time during function evaluation reaches at least this threshold time.

Number_of_Chromosome_Bundles_Needed_for_Rolling_Average: Provides the number of chromosome bundles (e.g. 25) (each having a certain number of chromosome data structures) that each slave processor will process to achieve an acceptable rolling average. The rolling average refers to the total time that the average timing data is collected over.

In addition, each slave processor 801 may maintain the following timing data:

Rolling_Average_Wait_Time: An amount of time that a slave processor 801 spends waiting for work from a master processor 800.

Average_Function_Evaluation_Time: A cumulative average time required by a slave processor 801 to process or evaluate a single chromosome data structure.

In an example embodiment of the disclosure, a goal of the example bundling calibration algorithm in block 904 may be to help keep the slave processors 801 at a fairly high (e.g., nearly 100%) utilization rate. Increasing the bundle size decreases the number of packets sent across the network and helps to minimize the time the slave processors 801 are waiting for work. However, if the bundle size is too large, a lag or delay may result in which a chromosome data structure may be potentially outdated by the evolutionary progress. The equilibrium bundle size may be dependent on the function evaluation times, such as times to receive performance metrics associated with a particular set of launch parameters, of the slave processors 801 and the network capability.

The bundling calibration algorithm may be performed by the master processor 800 for each slave processor 801. In an example embodiment of the disclosure, the bundling calibration algorithm may be performed for each slave processor 801 based upon the occurrence of one or more of the following conditions: (i) a sufficient number of chromosome data structures have already been processed and calibration has yet to occur, (ii) the rolling average wait time for a slave processor has changed by a threshold amount (e.g., >10%), and/or (iii) the number of slave processors 801 being managed by the master processor 800 has changed.

The chromosome bundles generated in block 904 may be allocated to the slave processors 801. Each slave processor 801 may evaluate, in accordance with a plurality of objective functions, the received chromosome bundle of chromosome data structures to generate a plurality of respective objective function values for each chromosome data structure. In addition, each slave processor 801 may also perform timing operations or calculations, including a determination of the Rolling_Average_Wait_Time and Average_Function_Evaluation_Time associated with the respective slave processor 801. As each slave processor 801 finishes the objective function evaluations and/or timing operations in block 815, the slave processor 801 may provide a results bundle (e.g., objective function values) and timing data to the master processor 800. The results bundle and timing data may be received in the "Finished" list or queue in block 912 or block 928, depending on the states of blocks 916, 920, and 924.

In particular, if the "To-Evaluate" list or queue is not empty (block 916), then the master processor 800 may wait for one or more slave processor 801 to finish, and the results bundle and timing data may be received into the "Finished" list or queue in block 912. Processing may then proceed from block 912 to block 914, where additional chromosome data structures from the "To-Evaluate" list or queue may be allocated in one or more chromosome bundles to one or more slave processors 801 that have previously finished processing and are waiting for additional work.

Once the "To-Evaluate" list or queue is empty, processing may proceed to block 920 to determine whether a parent population is being evaluated. If not, then the "Finished List" may be filled with the evaluated child population of chromosome data structures in block 922. On the other hand, if the parent population is being evaluated, then processing may proceed to block 94 to determine whether a predetermined population size (PopSize) has been evaluated. If so, then processing proceeds to block 932, where the "Finished List" may be filled with the evaluated parent population of chromosome data structures. On the other hand, block 924 may determine that less than the predetermined population size has been evaluated, and processing may proceed to block 926 to wait for one or more slave processors 801 to finish. Following block 926, processing may proceed to block 928 where the results bundle and timing data may be received from the just finishing slave processors 801 into the "Finished" list or queue. Processing may then proceed to block 930, where additional chromosome data structures are randomly generated and allocated in one or more chromosome bundles to one or more slave processors 801 for objective function evaluation.

In an example embodiment of the disclosure, block 930 may be utilized to keep available slave processors 801 working with randomly generated chromosome data structures until the predetermined parent population size has been reached. The modified parent population must have the prerequisite number of chromosome data structures, and some of the randomly generated chromosomes may complete processing prior to the chromosome data structures originating from the parent population; in this situation they will become part of the modified parent population, which is received back to block 914. The remaining randomly generated chromosomes will eventually complete and become part of a subsequent modified child population. Block 930 may improve efficiency by keeping slave processors 801 more fully employed, according to an example embodiment of the disclosure.

Figure 10:
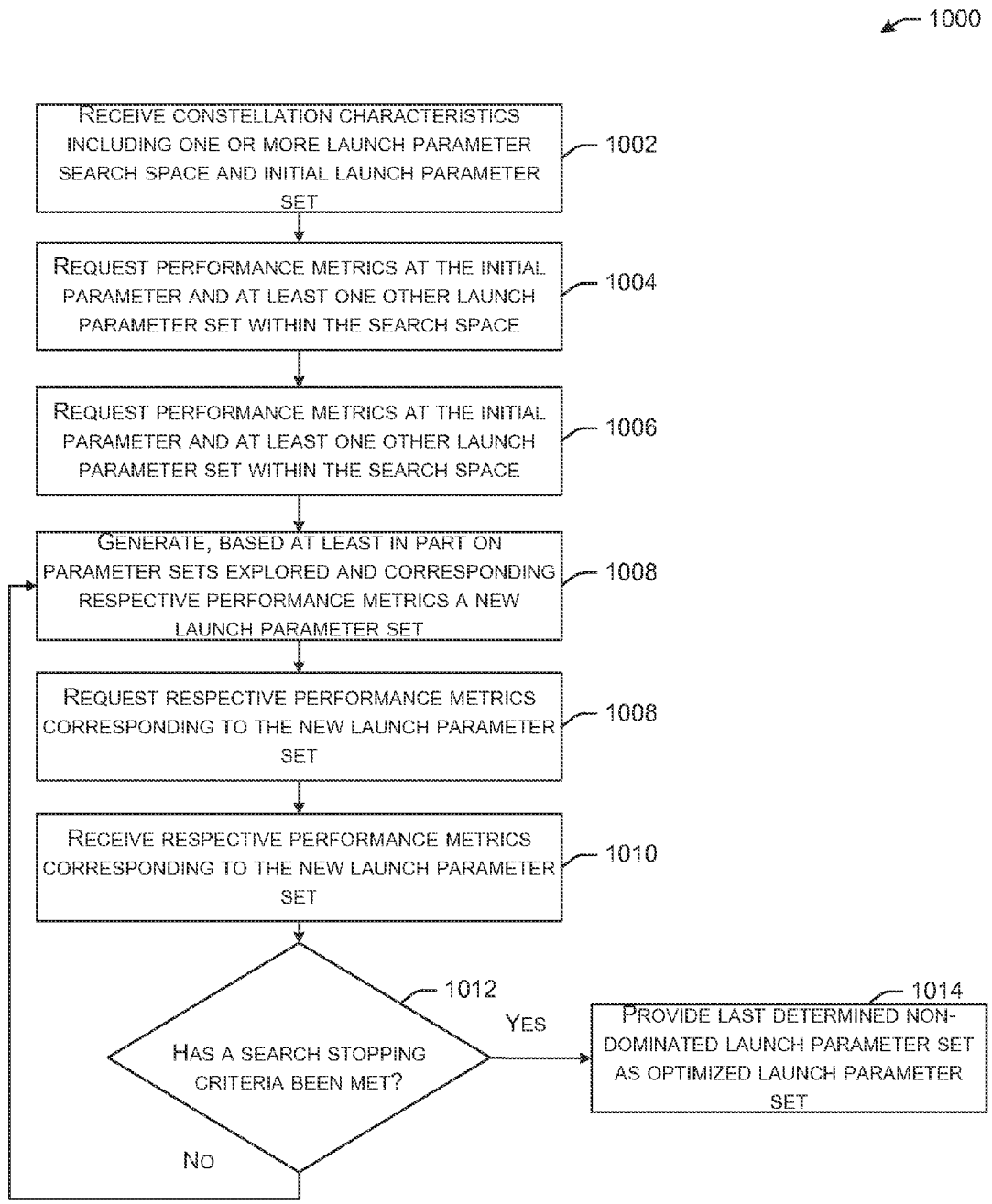
FIG. 10 illustrates a flow diagram depicting an example method for providing an optimized launch parameter set of a satellite constellation, in accordance with embodiments of the disclosure.

FIG. 10 illustrates a flow diagram depicting an example method 1000 for providing an optimized launch parameter set of a satellite constellation, in accordance with embodiments of the disclosure. This method 1000 may be performed, in example embodiments, by the heuristic optimizer system 400, in cooperation with one or more other components 410, 420, 430 of the satellite constellation deployment optimization system 330. In some example embodiments, this method 1000 may be performed by processors 500, or a subset thereof. In other example embodiments, this method 1000 may be performed by the processors 800, or a subset thereof.

At block 1002, constellation characteristics including one or more launch parameter search space and initial launch parameter set may be received. In addition, other constellation characteristics 310 may be received, such as the number of satellites in the satellite constellation to be designed, weight limits of individual satellites in the satellite constellation, the launch schedule of satellites in the of the satellite constellation, and/or the mission lifetime of the satellite constellation. In example embodiments, these constellation characteristics 310 may be provided by user input, such as from a graphical user interface (GUI) presented to the satellite constellation designer or from an input file generated by the satellite constellation designer. The received initial launch parameter set may be a starting point for the optimization to be performed. This may, in some example embodiments, be in the center of the received launch parameter search space. The launch parameter search space may indicate a range of launch parameters within which orbits of satellites of the satellite constellation must reside. In some cases, these launch parameter (i.e. semi-major axis, eccentricity, inclination, right ascension of ascending mode, argument of perigee, or mean anomaly) ranges of the satellites of each satellite of the satellite constellation may be selected to prevent spatial or other contention with other satellites or bodies orbiting the earth. In some cases, the initial launch parameter range may be allocated by a regulatory body, such as a regulatory body tasked with preventing contention of planned launches of various satellite constellations by various entities.

In some example embodiments, one or more of the station keeping criteria may be optimized by the satellite constellation deployment optimization system 330. For example, in some cases, the station keeping box, or spatial limits within which to maintain one or more satellites of the satellite constellation, may be optimized by the multi-objective optimization mechanisms of the satellite constellation deployment system 330. In another example, the amount of fuel for performing station keeping maneuvers of one or more satellites of the satellite constellation may be optimized by the multi-objective optimization mechanisms of the satellite constellation deployment system 330. In example embodiments where station keeping box is optimized, a subset of satellite parameters may be kept in control. For example, any subset of the semi-major axis, eccentricity, inclination, right ascension of ascending mode, argument of perigee, mean anomaly, or relative phase may be controlled by station keeping. In example embodiment, any one or more of the aforementioned satellite parameters may be optimized for a particular satellite of the satellite constellation for which an optimization is performed by the satellite constellation deployment system 330.

At block 1004, performance metrics for the initial launch parameter set and at least one other launch parameter set within the search space may be requested. The at least one other launch parameter set may, in certain example embodiments, be provided along with the initial launch parameter set, such as via user input. In other example embodiments, the at least one other launch parameter set may be selected by the heuristic optimizer system 400 from within the launch parameter space to be searched and/or explored. In some cases, the at least one other launch parameter set may be selected to be relatively distant, with respect to the multi-dimensional space of launch parameters to optimize, from the initial launch parameter set, to enable starting the optimization process by considering a large range within the identified search space. The request for the performance metrics, in example embodiments, may be transmitted to the performance metrics system 410. In some example embodiments, the request for the performance metrics may be transmitted to the SHARK system 420 in addition to the performance metrics system 410. As discussed above, in certain example embodiments, the SHARK system 420 may be configured to provide performance metrics associated with Δv and the performance metrics system 410 may be configured, in association with the SHARK system 420, to provide other performance metrics, such as satellite constellation related performance metrics.

At block 1006, respective performance metrics corresponding to the initial launch parameter set and the at least one other launch parameter set may be received responsive to the request for performance metrics for the initial launch parameter set and the at least one other launch parameter set. In example embodiments, the received performance metrics may be those that have been specified by the satellite constellation designer as optimization objectives and/or elements on which the optimization objectives of the optimization search is based. In example embodiments, the performance metrics may be received from the performance metrics system 410 and/or the SHARK system 420. In some cases, where the SHARK system 420 determines a particular performance metric, such as Δv, the results of that performance metric may be received from the performance metrics system 410, rather than directly from the SHARK system 420.

At block 1008, a new launch parameter set may be generated based at least in part on the launch parameter sets explored and corresponding respective performance metrics. In example embodiments, the performance metrics may be utilized to generate respective objective functions corresponding to each of the launch parameter sets evaluated. Launch parameter sets may be selected from a population of launch parameter sets based at least in part on processes of selection, such as those described above. For example, tournament selection processes may be used to identify the best chromosomes for generating a subsequent set of launch parameters to evaluate. Upon selection of chromosomes for generating further chromosomes, cross-over and/or mutation processes may be performed. From these processes, a new launch parameter set may be generated.

At block 1010, respective performance metrics corresponding to the new launch parameter set may be requested. As in the process of block 1004, the request for the performance metrics associated with the new launch parameter set may be transmitted to the performance metrics system 410 and/or the SHARK system 420. At block 1012, respective performance metrics corresponding to the new launch parameter set may be received. These respective performance metrics corresponding to the new launch parameter set may be received responsive to the request for the same by the processes of block 1010. These performance metrics may be those that are the optimization objectives or are used to generate optimization objective values that are used for the purposes of optimization of the satellite constellation under design.

At block 1014, it may be determined if a search stopping criterion been met. In example embodiments, the search stopping criterion may be any of a plurality of search stopping criteria. In one non-limiting example, the search may be performed for a predetermined number of cycles. In another non-limiting example, the search stopping criterion may entail stopping the optimization once a predetermined multi-dimensional volume of the search space, or a percentage thereof, has been explored. In yet further non-limiting examples, if a new non-dominated solution (or epsilon non-dominated solution) has not been found in the last pre-determined number of cycles and/or generations, then the search may be stopped. In still a further non-limiting example, if a termination criterion may be identified by meeting a box fitness criterion. In an example embodiment of the disclosure, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the search may be terminated.

If it is determined that a search stopping criterion has not been met at block 1014, then the method 1000 may return to block 1008, to generate additional chromosomes or launch parameter sets to evaluate based on already evaluated launch parameter sets and their corresponding performance metrics. If it is determined that a search stopping criterion has been met at block 1014, then the method 1000 may proceed to block 1016, where the last determined non-dominated launch parameter set may be provided as an optimized launch parameter set.

It should be noted that the method 1000 may be modified in various ways in accordance with certain embodiments. For example, one or more operations of the method 1000 may be eliminated or executed out of order in other embodiments. Additionally, other operations may be added to the method 1000 in accordance with other embodiments.

Figure 11:
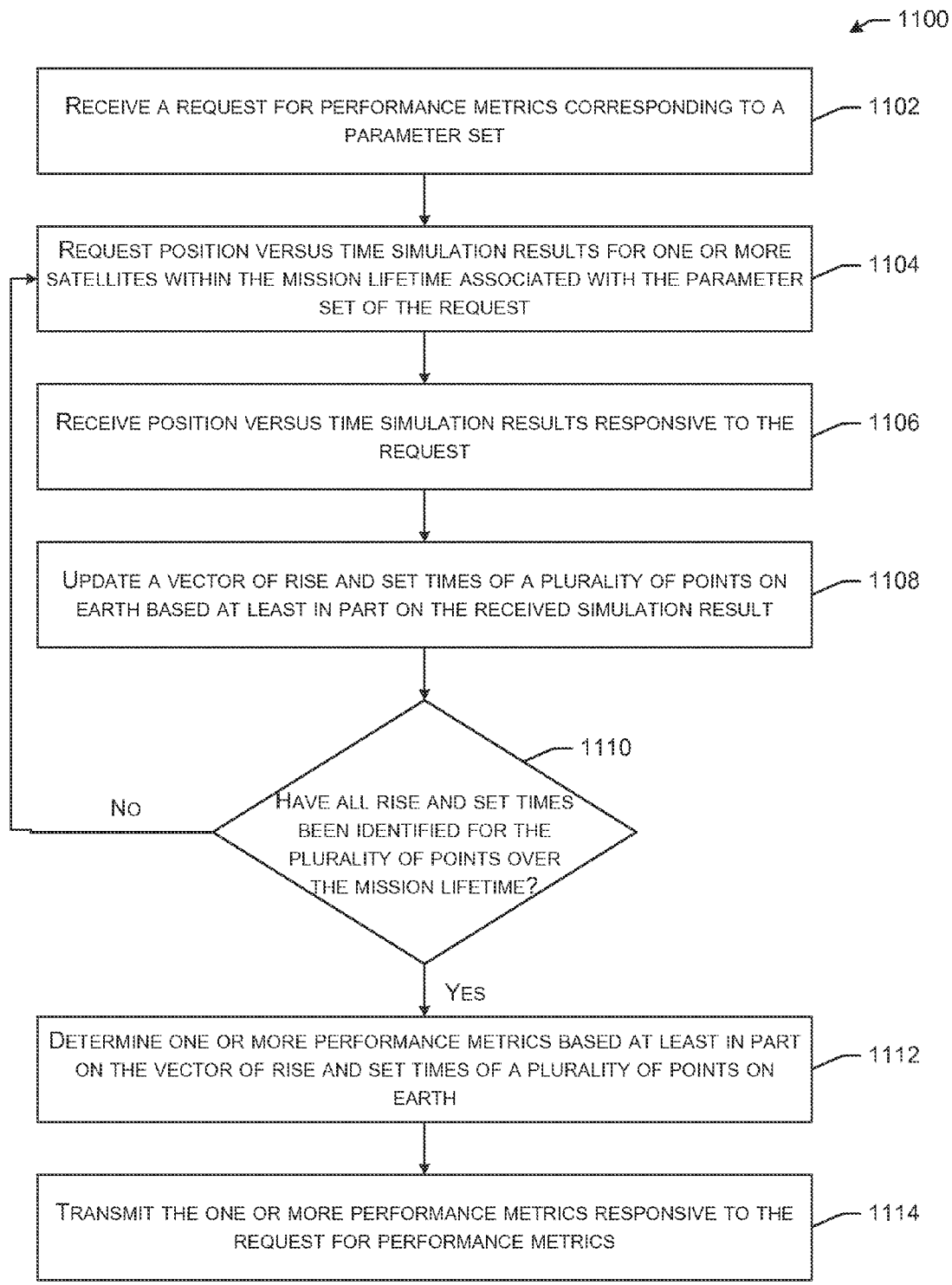
FIG. 11 illustrates a flow diagram depicting an example method for providing one or more performance metrics associated with a particular set of launch parameters of a satellite constellation, in accordance with embodiments of the disclosure.

FIG. 11 illustrates a flow diagram depicting an example method 1100 for providing one or more performance metrics associated with a particular set of launch parameters of a satellite constellation, in accordance with embodiments of the disclosure. This method 1100 may be performed, in example embodiments, by the performance metrics system 410, in cooperation with one or more other components 400, 420, 430 of the satellite constellation deployment optimization system 330. In some example embodiments, this method 1100 may be performed by processors 500, or a subset thereof. In other example embodiments, this method 1100 may be performed by the processors 700, or a subset thereof.

Figure 1:
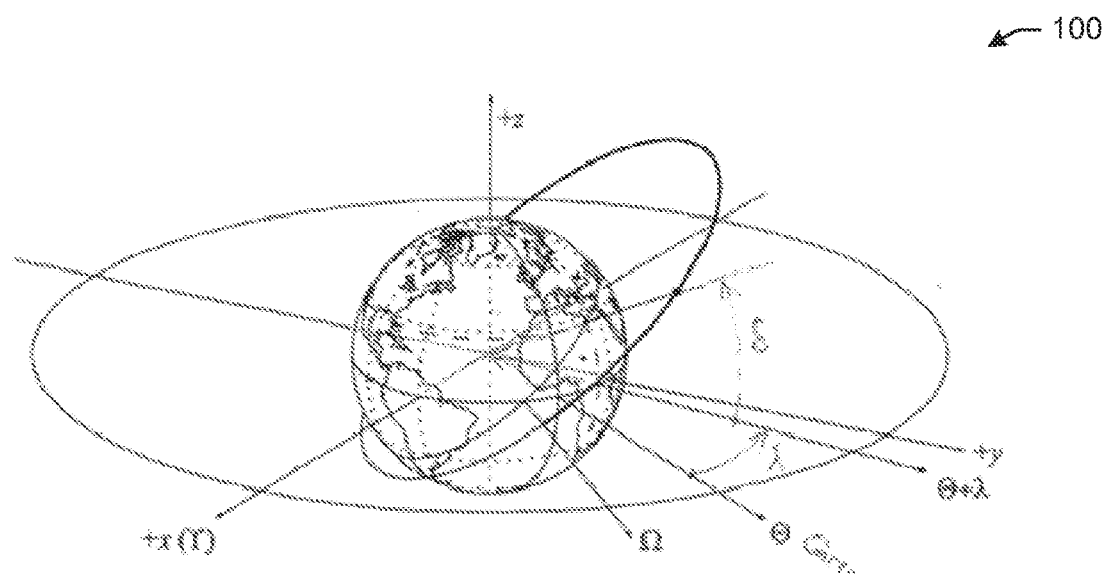
FIG. 1 is a schematic diagram that illustrates example launch parameters associated with satellites, in accordance with embodiments of the disclosure.

At block 1102, a request for performance metrics corresponding to a launch parameter set may be received. The request may be received from the heuristic optimizer system 400, as generated according to the process of block 1004 and/or 1010 of example method 1000 as depicted of FIG. 1. In example embodiments, the request may specify the performance parameters to be provided. The performance metrics to be generated and returned to the heuristic optimizer system 400. For example, a particular request for performance metrics may indicate the set of launch parameters to be evaluated (i.e. semi-major axis, eccentricity, inclination, right ascension of ascending mode, argument of perigee, or mean anomaly). This may be a set of launch parameters that are under evaluation currently by the heuristic optimizer system 400.

At block 1104, position versus time simulation results may be requested for one or more satellites within the mission lifetime associated with the launch parameter set of the request. This position versus time simulation results may be requested from the SHARK system 420. The simulation results may be requested to identify one or more rise and/or set times associated with one or more points on the surface of the earth with respect to one or more of the satellites of the satellite constellation under design. At block 1106, position versus time simulation results may be received responsive to the request. These simulation results may be received from the SHARK system 420. It will be appreciated that these results may account for perturbing accelerations, such as those due to gravity of the sun and/or moon or from the oblateness of the earth, to the satellites of the satellite constellation being designed.

At block 1108, a vector of rise and set times of a plurality of points on the surface of the earth may be updated based at least in part on the received simulation results. In other words, based at least in part on the location vs. time information of one or more satellites of the satellite constellation under design, as received at block 1106, rise and/or set times for various points on the surface of the earth may be determined for each satellite of the satellite constellation being designed. It will be appreciated that the rise and set times and/or locations may depend on a criterion of minimum elevation angle for viewing a particular satellite from a particular point on the earth. This information may be used to update a file recording each rise and set time of each satellite at each of the points selected on the surface of the earth during the mission lifetime of the satellite constellation.

At block 1110, it may be determined if all of the rise and set times have been identified for the plurality of points over the mission lifetime of the satellite constellation. If it is determined that all of the rise and set times for each of the satellites of the satellite constellation being designed have not been identified (i.e. for all points on the surface of the earth, for each satellite of the satellite constellation for the full duration of the mission lifetime), then the method 1100 may return to block 1104 to request further position versus time information to identify additional rise and set events associated with the satellite constellation being designed. If however, it is determined that all of the rise and set times of all the satellites have been identified, then the method 1100 may proceed to block 1112, where one or more performance metrics may be determined based at least in part on the vector of rise and set times of the plurality of points on the earth. Individual performance, such as coverage performance, revisit times, or the like, at each of the plurality of points may be determined for a particular set of initial launch parameters, such as initial launch parameters provided by the heuristic optimizer system 400. The performance metric system 410 may further be configured to aggregate the performance determined for the plurality of points, such as by determining averages, minima, maxima, or the like. At block 1114, the one or more performance metrics may be transmitted responsive to the request for performance metrics. The performance metrics may, in example embodiments, be transmitted to the heuristic optimizer system 400.

In some example embodiments, not all of the requested performance metrics may be determined by the performance metrics system 410 by soliciting high-fidelity location versus time information for satellites of the satellite constellation for which the optimization is being performed. In some example embodiments, some of the performance metrics may be determined by the SHARK system 420. For example, $\Delta v$ may be determined by the SHARK system 420 and not the performance metric system 410. If $\Delta v$ is indeed a performance metric being considered (i.e. as an optimization objective or as part of an aggregated optimization objective), then the $\Delta v$ for a particular set of launch parameters under evaluation by the heuristic optimizer system 400 may be provided by the SHARK system 420 directly to the heuristic optimizer system 400 in some example embodiments, or alternatively via the performance metrics system 410 in other example embodiments. Therefore, in some example embodiments, the method 1100 may further entail requesting $\Delta v$ by the performance metrics system 410 form the SHARK system 420 prior to returning, responsive to the request for performance metrics, a set of performance metrics including $\Delta v$ and those derived in block 1112 based at least in part on high-fidelity satellite location information.

It should be noted that the method 1100 may be modified in various ways in accordance with certain embodiments. For example, one or more operations of the method 1100 may be eliminated or executed out of order in other embodiments. Additionally, other operations may be added to the method 1100 in accordance with other embodiments.

Figure 12:
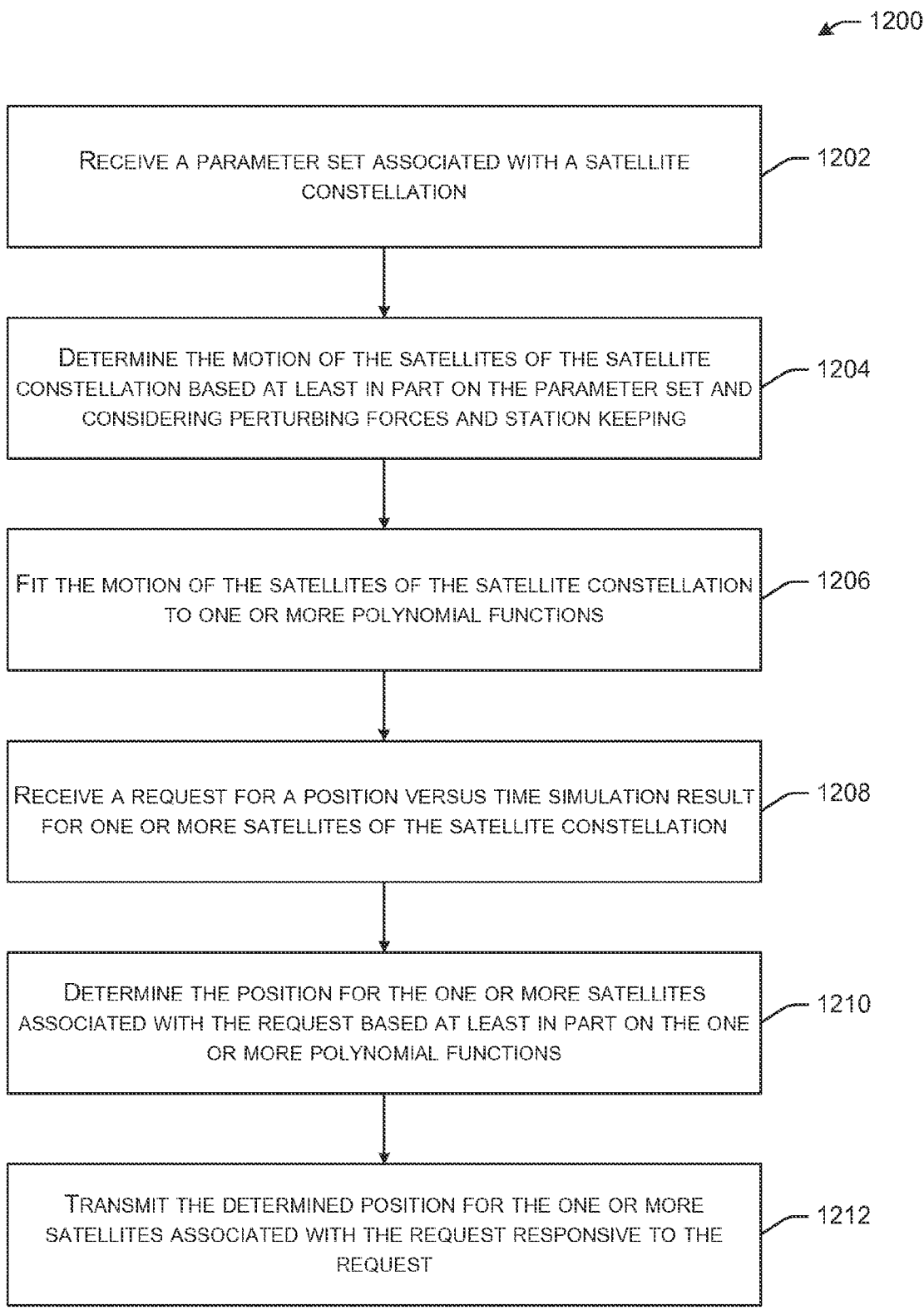
FIG. 12 illustrates a flow diagram depicting an example method for providing a position of one or more satellites of a satellite constellation at a particular time, in accordance with embodiments of the disclosure.

FIG. 12 illustrates a flow diagram depicting an example method 1200 for providing a position of one or more satellites of a satellite constellation at a particular time, in accordance with embodiments of the disclosure. This method 1200 may be performed, in example embodiments, by the SHARK system 420, in cooperation with one or more other components 400, 410, 430 of the satellite constellation deployment optimization system 330. In some example embodiments, this method 1200 may be performed by processors 500, or a subset thereof. In other example embodiments, this method 1200 may be performed by the processors 600, or a subset thereof.

At block 1202, a parameter set associated with a satellite constellation may be received. This parameter set may be received as part of a request for location versus time information, such as from the performance metrics system 410 during the processes of block 1104 of method 1100 of FIG. 11. At block 1204, the motion of the satellites of the satellite constellation may be determined based at least in part on received launch parameter set and considering perturbing forces and station keeping. A satellite's motion may be predicted as a function of time in the presence of a user-selectable set of perturbations, including, for example, the disturbing acceleration due to the Earth's oblate shape, atmospheric drag, solar radiation pressure, gravitational effects of the Sun and Moon, and nutation/precession of the Earth. The perturbation equations that describe the time rates of change of the orbital position can be derived from Newton's Universal Law of Gravitation by treating each perturbation (e.g., oblate Earth, drag, etc.) as a disturbing acceleration in the equations of motion. These equations may be utilized to accurately predict a satellite's position and velocity over decadal time scales. In example embodiments, the motion of each of the satellites of the satellite constellation under optimization may be determined for a predefined number of orbits and/or portions of orbits using fundamental laws of motion, such as Newton's Universal Law of Gravitation.

It may also be determined, in example embodiments where the satellite constellation requires station keeping (i.e. the satellites of the satellite constellation are not completely passively controlled) when, where, and on what satellite station keeping ($\Delta v$) may be required. In example embodiments, this may be determined by receiving and/or identifying a spatial region within which a particular satellite is to remain and determining when and/or where the particular satellite may move outside of the allowable spatial region. In further example embodiments, if a satellite goes out of allowable bands of its station location may be determined. If or when the satellite goes outside of its station bounds, it may be recognized that station keeping ($\Delta v$) is needed to restore the satellite within the allowable bands of its station (i.e. launch) parameters. When station keeping is required, a log of the times and locations of the $\Delta v$ and/or a running total $\Delta v$ may be maintained. The coordinates (i.e. spatial and/or temporal) where station keeping is implemented may present additional discontinuities and/or non-linearities in the models, such in the fitted polynomials, as described with reference to block 1206. In some example case, such as for $\Delta v$, the SHARK system 420 may provide performance parameters directly or via the performance metrics system 410 to the heuristic optimizer system 400.

At block 1206, the motion of the satellites of the satellite constellation under design may be fit to one or more fitting functions. Therefore, according to example embodiments, a portion of the motion of a satellite, during a portion of time within the mission lifetime of the satellite may be determined by applying Newton's Universal Law of Gravitation and then fitting the results to one or more polynomial functions, such as Chebyshev functions. The fitting coefficients associated with the one or more polynomials associated with a satellite with a particular initial launch parameters may be stored in an orbit table, such as in a memory device and/or database, for relatively quick access and use.

At block 1208, a request for a position versus time simulation result may be received for one or more of the satellites of the satellite constellation for which optimization is being performed. This request may be received from the performance metric system 410 for the purposes of determining one or more performance metrics associated with the set of launch parameters received as part of the processes of block 1202.

At block 1210, the position for the one or more satellites associated with the request may be determined based at least in part on the one or more polynomial functions. The motion of the satellite may be determined by utilizing the fitted polynomials, rather than solve the more complex Newton's Universal Law of Gravitation each time a satellite location and/or motion is requested. In other words, to more efficiently (i.e. using fewer computational resources) and/or to more quickly provide location and/or motion information regarding a particular satellite within a suitable level of error, extrapolate and/or interpolate the location of the satellite using the one or more fitted polynomials, such as fitted Chebyshev functions. At block 1212, the determined position for the one or more satellites associated with the request may be transmitted responsive to the request. In example embodiments, the determined position information may be transmitted to the performance metrics system 410.

It should be noted that the method 1200 may be modified in various ways in accordance with certain embodiments. For example, one or more operations of the method 1200 may be eliminated or executed out of order in other embodiments. Additionally, other operations may be added to the method 1200 in accordance with other embodiments.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
    identifying, by a satellite constellation deployment optimization system comprising one or more processors, a first set of launch parameters and a second set of launch parameters associated with a satellite constellation comprising one or more satellites;
    identifying, by the satellite constellation deployment optimization system, one or more objective values for evaluating the first set of launch parameters and second set of launch parameters by applying one or more objective functions to one or more performance metrics corresponding to each of the first set of launch parameters and the second set of launch parameters;
    determining, by the satellite constellation deployment optimization system and based at least in part on the first set of launch parameters and the second set of launch parameters, a third set of launch parameters within a launch parameter search space;
    determining, by the satellite constellation deployment optimization system, motion of each of the one or more satellites of the satellite constellation according to the third set of launch parameters over a mission lifetime of the satellite constellation utilizing a high-fidelity astrodynamics propagator, wherein the motion of each of the one or more satellites of the satellite constellation is determined based at least in part on one or more orbital perturbations;
    generating, by the satellite constellation deployment optimization system and based at least in part on the motion of each of the one or more satellites of the satellite constellation according to the third set of launch parameters over a mission lifetime of the satellite constellation, one or more satellite constellation performance metrics for the third set of launch parameters;
    determining, by the satellite constellation deployment optimization system and based at least in part on the performance metrics for the third set of launch parameters and the one or more objective functions, objective values for the third set of launch parameters;
    determining, by the satellite constellation deployment optimization system and based at least in part on the objective values for the third set of launch parameters, that the third set of launch parameters are non-dominated; and
    providing, by the satellite constellation deployment optimization system and based at least in part on the determining that the third set of launch parameters are non-dominated, the third set of launch parameters as an optimized solution for the satellite constellation.

2. The method of claim 1, wherein each of the first set of launch parameters, second set of launch parameters, and third set of launch parameters include at least one of: (i) semimajor axis; (ii) eccentricity; (iii) inclination; (iv) right ascension of ascending mode; (v) argument of perigee; (vi) mean anomaly; (vii) launch date(s); or (viii) station keeping criteria.

3. The method of claim 1, wherein the one or more objective values are the same as the one or more performance metrics for each of the first set of launch parameters, second set of launch parameters, and third set of launch parameters.

4. The method of claim 1, wherein the one or more objective values comprise at least one of: (i) average response times; (ii) revisit times; (iii) earth coverage; (iv) fuel weight; (v) longest revisit time during the mission lifetime; (vi) aggregate station keeping during the mission lifetime; or (vii) minimum elevation angle.

5. The method of claim 1, wherein determining a third set of launch parameters further comprises:
    selecting, by the satellite constellation deployment optimization system, the first set of launch parameters as a first parent chromosome data structure and the second set of launch parameters as a second parent chromosome;
    performing, by the satellite constellation deployment optimization system, a crossover operation between the first parent chromosome data structure and the second parent chromosome structure; and
    performing, by the satellite constellation deployment optimization system, a mutation on a result from the crossover operation to generate the third set of launch parameters.

6. The method of claim 1, wherein determining motion of each of the one or more satellites of the satellite constellation according to the third set of launch parameters over the mission lifetime of the satellite constellation comprises:
    determining, by the satellite constellation deployment optimization system, the motion of each of the one or more satellites of the satellite constellation for a single orbit, or portion thereof, based at least in part on the force due to earth's gravity, the force due to the one or more orbital perturbations on each of the one or more satellites of the satellite constellation, and the level of station keeping to maintain one or more orbital parameters within a predetermined threshold; and
    fitting, by the satellite constellation deployment optimization system, the motion of each of the one or more satellites of the satellite constellation to one or more polynomials, wherein the one or more polynomials model the motion of the satellite over the mission lifetime.

7. The method of claim 6, wherein the level of station keeping is to be optimized by optimizing station keeping parameters, including at least one range of a particular launch parameter.

8. The method of claim 1, wherein the one or more orbital perturbations comprises at least one of: (i) perturbation due to the gravitational force of the sun; (ii) perturbation due to the gravitational force of the moon; (iii) perturbation due to atmospheric drag; (iv) perturbation due to the force of solar radiation; (v) perturbation due to force of dynamic solid tide; (vi) perturbation due to force from absorption of electromagnetic radiation; or (vii) perturbation due to the earth's geopotential.

9. The method of claim 1, wherein generating one or more satellite constellation performance metrics for the third set of launch parameters comprises:
identifying, by the satellite constellation deployment optimization system, a minimum elevation angle associated with a plurality of points on earth;
determining, by the satellite constellation deployment optimization system and from the motion of each of the one or more satellites of the satellite constellation according to the third set of launch parameters over the mission lifetime of the satellite constellation, a rise and set time vector associated with each of the satellites of the satellite constellation for each of the plurality of points on earth, in accordance with the minimum elevation angle; and
determining, by the satellite constellation deployment optimization system and based at least in part on the rise and set time vector associated with each of the satellites of the satellite constellation for each of the plurality of points on earth, the one or more satellite constellation performance metrics.

10. The method of claim 1, wherein determining that the third set of launch parameters are non-dominated comprises:
determining, by the satellite constellation deployment optimization system, one or more additional sets of launch parameters based at least in part on the third set of launch parameters;
identifying, by the satellite constellation deployment optimization system, corresponding respective objective values of the one or more additional sets of launch parameters; and
identifying, by the satellite constellation deployment optimization system, that each of the objective values of the third set of parameters is not dominated by the corresponding objective values of the one or more additional sets of launch parameters or the objective values of the first set of launch parameters or the second set of launch parameters.

11. A system, comprising:
a memory that stores computer-executable instructions;
at least one processor configured to access the memory, wherein the at least one processor is further configured to execute the computer-executable instructions to:
identify a first set of launch parameters and a second set of launch parameters associated with a satellite constellation comprising one or more satellites;
identify one or more objective values for evaluating the first set of launch parameters and second set of launch parameters by applying one or more objective functions to one or more performance metrics corresponding to each of the first set of launch parameters and the second set of launch parameters;
determine, based at least in part on the first set of launch parameters and the second set of launch parameters, a third set of launch parameters within a launch parameter search space;
determine motion of each of the one or more satellites of the satellite constellation according to the third set of launch parameters over a mission lifetime of the satellite constellation, wherein the motion of each of the one or more satellites of the satellite constellation is determined based at least in part on one or more orbital perturbations;
generate, based at least in part on the motion of each of the one or more satellites of the satellite constellation according to the third set of launch parameters over a mission lifetime of the satellite constellation, one or more satellite constellation performance metrics for the third set of launch parameters;
determine, based at least in part on the performance metrics for the third set of launch parameters and the one or more objective functions, objective values for the third set of launch parameters;
determine, based at least in part on the objective values for the third set of launch parameters, that the third set of launch parameters are non-dominated; and
provide, based at least in part on the determining that the third set of launch parameters are non-dominated, the third set of launch parameters as an optimized solution for the satellite constellation.

12. The system of claim 11, wherein each of the first set of launch parameters, second set of launch parameters, and third set of launch parameters include at least one of: (i) semi-major axis; (ii) eccentricity; (iii) inclination; (iv) right ascension of ascending mode; (v) argument of perigee; (vi) mean anomaly; (vii) launch date(s); or (viii) station keeping criteria.

13. The system of claim 11, wherein the one or more objective values are the same as the one or more performance metrics for each of the first set of launch parameters, second set of launch parameters, and third set of launch parameters.

14. The system of claim 11, wherein the one or more objective values comprise at least one of: (i) average response times; (ii) revisit times; (iii) earth coverage; (iv) fuel weight; (v) longest revisit time during the mission lifetime; (vi) aggregate station keeping during the mission lifetime; or (vii) minimum elevation angle.

15. The system of claim 11, wherein to determine a third set of launch parameters the at least one processor is further configured to execute the computer-executable instructions to:
select the first set of launch parameters as a first parent chromosome data structure and the second set of launch parameters as a second parent chromosome;
perform a crossover operation between the first parent chromosome data structure and the second parent chromosome structure; and
perform a mutation on a result from the crossover operation to generate the third set of launch parameters.

16. The system of claim 15, wherein to determine motion of each of the one or more satellites of the satellite constellation according to the third set of launch parameters over the mission lifetime of the satellite constellation further comprises the at least one processor to execute the computer-executable instructions to:
determine the motion of each of the one or more satellites of the satellite constellation for a single orbit, or portion thereof, based at least in part on the force due to earth's gravity, the force due to the one or more orbital perturbations on each of the one or more satellites of the satellite constellation, and the level of station keeping to maintain one or more orbital parameters within a predetermined threshold; and
fit the motion of each of the one or more satellites of the satellite constellation to one or more polynomials, wherein the one or more polynomials model the motion of the satellite over the mission lifetime.

17. The system of claim 16, wherein the level of station keeping is to be optimized by optimizing station keeping parameters, including at least one range of a particular launch parameter.

18. The system of claim 11, wherein the one or more orbital perturbations comprises at least one of: (i) perturbation due to the gravitational force of the sun; (ii) perturbation due to the gravitational force of the moon; (iii) perturbation due to atmospheric drag; (iv) perturbation due to the force of solar radiation; (v) perturbation due to force of dynamic solid tide; (vi) perturbation due to force from absorption of electromagnetic radiation; or (vii) perturbation due to the oblateness of the earth.

19. The system of claim 11, wherein generating one or more satellite constellation performance metrics for the third set of launch parameters further comprises the at least one processor executes the computer-executable instructions to:
 identify a minimum elevation angle associated with a plurality of points on earth;
 determine, from the motion of each of the one or more satellites of the satellite constellation according to the third set of launch parameters over the mission lifetime of the satellite constellation, a rise and set time vector associated with each of the satellites of the satellite constellation for each of the plurality of points on earth, in accordance with the minimum elevation angle; and
 determine, based at least in part on the rise and set time vector associated with each of the satellites of the satellite constellation for each of the plurality of points on earth, the one or more satellite constellation performance metrics.

20. The system of claim 11, wherein to determine that the third set of launch parameters are non-dominated comprises the at least one processor further executes the computer-executable instructions to:
 determine one or more additional sets of launch parameters based at least in part on the third set of launch parameters;
 identify corresponding respective objective values of the one or more additional sets of launch parameters; and
 identify that each of the objective values of the third set of parameters is not dominated by the corresponding objective values of the one or more additional sets of launch parameters or the objective values of the first set of launch parameters or the second set of launch parameters.

* * * * *